(12) United States Patent
Jee

(10) Patent No.: US 12,067,679 B2
(45) Date of Patent: Aug. 20, 2024

(54) METHOD AND APPARATUS WITH 3D MODELING OF HUMAN BODY

(71) Applicant: SAMSUNG ELECTRONICS CO., LTD., Suwon-si (KR)

(72) Inventor: Seunghoon Jee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 17/732,803

(22) Filed: Apr. 29, 2022

(65) Prior Publication Data

US 2023/0169725 A1    Jun. 1, 2023

(30) Foreign Application Priority Data

Nov. 29, 2021 (KR) .......................... 10-2021-0166589

(51) Int. Cl.
*G06T 7/50* (2017.01)
*G06T 7/70* (2017.01)
*G06T 17/20* (2006.01)

(52) U.S. Cl.
CPC ................ *G06T 17/20* (2013.01); *G06T 7/50* (2017.01); *G06T 7/70* (2017.01); *G06T 2207/20084* (2013.01); *G06T 2207/30196* (2013.01)

(58) Field of Classification Search
CPC .............. G06T 17/20; G06T 7/50; G06T 7/70
See application file for complete search history.

(56) References Cited

U.S. PATENT DOCUMENTS

| | | | |
|---|---|---|---|
| 2016/0253839 A1* | 9/2016 | Cole | H04N 13/189 345/420 |
| 2016/0378176 A1 | 12/2016 | Shiu et al. | |
| 2020/0097707 A1 | 3/2020 | Chou et al. | |

(Continued)

FOREIGN PATENT DOCUMENTS

| | | |
|---|---|---|
| JP | 2018-200568 A | 12/2018 |
| KR | 10-2017-0134829 A | 12/2017 |

OTHER PUBLICATIONS

Cha et al., Towards Fully Mobile 3D Face, Body, and Environment Capture Using Only Head-worn Cameras; IEEE Transactions on Visualization and Computer Graphics, vol. 24, No. 11, Nov. 2018; pp. 2993-3004 (Year: 2018).*

(Continued)

*Primary Examiner* — Samantha (Yuehan) Wang
(74) *Attorney, Agent, or Firm* — NSIP Law

(57) ABSTRACT

A method with three-dimensional (3D) modeling of a wearer of a wearable device includes generating a feature map for each of a plurality of images of the wearer obtained from a plurality of imaging devices provided in the wearable device, obtaining joint keypoint information corresponding to joint positions of the wearer and initial shape coefficient information associated with a shape of the wearer based on the feature map for each of the images, determining a target 3D joint angle for 3D modeling of the wearer based on the joint keypoint information and the initial shape coefficient information, determining target shape coefficient information for 3D modeling of the wearer based on the joint keypoint information and the initial shape coefficient information, and obtaining a 3D mesh of the wearer based on the target 3D joint angle and the target shape coefficient information.

26 Claims, 11 Drawing Sheets

(56) References Cited

U.S. PATENT DOCUMENTS

| | | | |
|---|---|---|---|
| 2021/0158028 A1* | 5/2021 | Wu | G16H 30/20 |
| 2021/0232924 A1 | 7/2021 | Sun et al. | |
| 2021/0248772 A1 | 8/2021 | Iqbal et al. | |
| 2021/0279943 A1* | 9/2021 | Murez | G06N 3/082 |
| 2022/0230327 A1* | 7/2022 | Croxford | G06T 7/20 |
| 2022/0258049 A1* | 8/2022 | Kanani | G06Q 30/0621 |
| 2022/0301304 A1* | 9/2022 | Hampali | G06V 20/20 |

OTHER PUBLICATIONS

Cha, Young-Woon, et al., "Towards Fully Mobile 3D Face, Body, and Environment Capture Using Only Head-worn Cameras", IEEE Transactions on Visualization and Computer Graphics 24.11 (2018): 2993-3004.

Han, Shangchen, et al., "MEgATrack: Monochrome Egocentric Articulated Hand-Tracking for Virtual Reality", ACM Transactions on Graphics (TOG) 39.4 (2020): (13 pages in English).

Wang, Jian, et al., "Estimating Egocentric 3D Human Pose in Global Space", Proceedings of the IEEE/CVF International Conference on Computer Vision. {jianwang,lliu,ksarkar,theobalt}@mpi-inf.mpg.de, xuweipeng@fb.com, 2021. pp. 1-10.

\* cited by examiner

METHOD AND APPARATUS WITH 3D MODELING OF HUMAN BODY

CROSS-REFERENCE TO RELATED APPLICATIONS

This application claims the benefit under 35 USC § 119(a) of Korean Patent Application No. 10-2021-0166589 filed on Nov. 29, 2021, in the Korean Intellectual Property Office, the entire disclosure of which is incorporated herein by reference for all purposes.

BACKGROUND

1. Field

The following description relates to a method and apparatus for three-dimensional (3D) modeling of a human body, and more particularly, to a method and apparatus for 3D modeling of a body of a person wearing a wearable device.

2. Description of Related Art

A technology for extracting a human pose from an image has been advanced further and is being used in various fields of application including security and medical fields in addition to conventional fields of application including action recognition, animation, virtual reality (VR), and augmented reality (AR). For example, there is ongoing research on a method of restoring a human model in a three-dimensional (3D) space to represent a detailed human movement, in addition to extracting a simple pose, in order to generate an avatar in an AR or VR space. To project a movement of a person to an avatar in a virtual space, information associated with joint positions, joint angles, and a body shape of the person may be used.

There is active research on a method for 3D modeling of a human body from a two-dimensional (2D) image using an artificial intelligence (AI) technology including machine learning, artificial neural networks, or deep learning. The method may include, for example, a computer vision-based method such as a method of discovering a joint position of a person based on each pixel position in a 2D image, a method of estimating a shape including the skin of a person, and the like.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with three-dimensional (3D) modeling of a wearer of a wearable device, the method includes generating a feature map for each of a plurality of images of the wearer obtained from a plurality of imaging devices provided in the wearable device, obtaining joint keypoint information corresponding to joint positions of the wearer and initial shape coefficient information associated with a shape of the wearer based on the feature map, for each of the images, determining a target 3D joint angle for 3D modeling of the wearer based on the joint keypoint information and the initial shape coefficient information, determining target shape coefficient information for 3D modeling of the wearer based on the joint keypoint information and the initial shape coefficient information, and obtaining a 3D mesh of the wearer based on the target 3D joint angle and the target shape coefficient information. The joint keypoint information may include two-dimensional (2D) pixel information and depth information.

The feature map may be generated based on at least one of Mobilenet, Googlenet, and Resnet.

The obtaining of the joint keypoint information and the initial shape coefficient information for each of the images may include obtaining the 2D pixel information inferred based on the feature map and a first convolutional neural network (CNN) model, obtaining the depth information inferred based on the feature map and a second CNN model, and obtaining the initial shape coefficient information through iterative regression on the feature map.

The determining of the target 3D joint angle may include calculating an error of the 2D pixel information, calculating an error of the depth information, calculating a 3D joint angle error with respect to time, calculating a total error of a 3D joint angle based on the error of the 2D pixel information, the error of the depth information, and the 3D joint angle error with respect to time, and determining a 3D joint angle minimizing the total error to be the target 3D joint angle.

When the imaging devices include a left imaging device provided on a left side of the wearable device and a right imaging device provided on a right side of the wearable device, the error of the 2D pixel information may be calculated based on Equation 1, $$E_{2D} = \sum_i \left\| v_{li} \left( \prod_l (X_i(\theta, \beta_{t-1})) - \hat{p}_{li} \right) \right\|_2^2 + \left\| v_{ri} \left( \prod_r (X_i(\theta, \beta_{t-1})) - \hat{p}_{ri} \right) \right\|_2^2,$$ [Equation 1]

where $E_{2D}$ denotes the error of the 2D pixel information, $\theta$ denotes a 3D joint angle, $\beta$ denotes shape coefficient information, $X_i$ denotes 3D position information of an ith joint in a skinned multi-person linear model (SMPL) that outputs vertices using $\theta$ and $\beta$ as an input, $\prod_l$ denotes a function for projection to a position at which the left imaging device is provided, $\prod_r$ denotes a function for projection to a position at which the right imaging device is provided, $\hat{p}_{li}$ denotes the 2D pixel information of the ith joint in an image obtained by the left imaging device, $\hat{p}_{ri}$ denotes the 2D pixel information of the ith joint in an image obtained by the right imaging device, $v_{li}$ denotes information as to whether the ith joint is observed in the image obtained by the left imaging device and it is 1 when the joint is observed and is 0 when the joint is not observed, $v_{ri}$ denotes information as to whether the ith joint is observed in the image obtained by the right imaging device and it is 1 when the joint is observed and is 0 when the joint is not observed, and $\|\|_2^2$ is a square of an L2-norm that denotes a sum of squares of respective components.

Initial shape coefficient information $\beta 0$ which is an initial value of the shape coefficient information $\beta$ may be a mean of initial shape coefficient information $\beta l$ obtained from the image obtained by left imaging device and initial shape coefficient information $\beta r$ obtained from the image obtained by right imaging device.

When the imaging devices include a left imaging device provided on a left side of the wearable device and a right imaging device provided on a right side of the wearable device, the error of the depth information may be calculated by summating an error of left depth information and an error of right depth information, and the error of the left depth information may be calculated based on Equation 2 and the error of the right depth information may be calculated based on Equation 3, $$E_{dist\_l} = \sum_i \left\| v_{li}(dist_l(X_i(\theta, \beta_{t-1})) - dist_l(X_0(\theta, \beta_{t-1})) - (\hat{d}_{li} - \hat{d}_{l0}) \right\|_2^2, \quad \text{[Equation 2]}$$

where $E_{dist\_l}$ denotes the error of the left depth information, $\theta$ denotes a 3D joint angle, $\beta$ denotes shape coefficient information, $X_i$ denotes 3D position information of an ith joint in an SMPL that outputs vertices using $\theta$ and $\beta$ as an input, $dist_l$ denotes joint depth information in the SMPL in an image obtained by the left imaging device, $X_0$ denotes 3D position information of a reference joint in the SMLP, $v_{li}$ denotes information as to whether the ith joint is observed in the image obtained by the left imaging device and it is 1 when the joint is observed and is 0 when the joint is not observed, $\hat{d}_{li}$ denotes depth information of the ith joint in the image obtained by the left imaging device, $\hat{d}_{l0}$ denotes an initial value of the depth information of the ith joint in the image obtained by the left imaging device, and $\|\cdot\|_2^2$ is a square of an L2-norm that denotes a sum of squares of respective components, and $$E_{dist\_r} = \sum_i \left\| v_{ri}(dist_r(X_i(\theta, \beta_{t-1})) - dist_r(X_0(\theta, \beta_{t-1})) - (\hat{d}_{ri} - \hat{d}_{r0}) \right\|_2^2, \quad \text{[Equation 3]}$$

where $E_{dist\_r}$ denotes the error of the right depth information, $\theta$ denotes a 3D joint angle, $\beta$ denotes shape coefficient information, $X_i$ denotes 3D position information of an ith joint in an SMPL that outputs vertices using $\theta$ and $\beta$ as an input, $dist_r$ denotes joint depth information in the SMPL in an image obtained by the right imaging device, $X_0$ denotes 3D position information of a reference joint in the SMPL, $v_{ri}$ denotes information as to whether the ith joint is observed in the image obtained by the right imaging device and it is 1 when the joint is observed and is 0 when the joint is not observed, $\hat{d}_{ri}$ denotes depth information of the ith joint in the image obtained by the right imaging device, $\hat{d}_{r0}$ denotes an initial value of the depth information of the ith joint in the image obtained by the right imaging device, and $\|\cdot\|_2^2$ is a square of an L2-norm that denotes a sum of squares of respective components.

The 3D joint angle error over time may be calculated based on Equation 4, $$E_{temp} = \|\theta - \theta_{t-1}\|_2^2 \quad \text{[Equation 4]}$$

where $E_{temp}$ denotes the 3D joint angle error over time, $\theta$ denotes a 3D joint angle, $\theta_{t-1}$ denotes a 3D joint angle in an immediately previous frame, and $\|\cdot\|_2^2$ is a square of an L2-norm that denotes a sum of squares of respective components.

The target shape coefficient information may be calculated based on Equation 5, $$\hat{\beta} = \min\left(\sum_t E_{2D}(\theta_t, \beta)\right), \quad \text{[Equation 5]}$$

where $\hat{\beta}$ denotes the target shape coefficient information, $E_{2D}$ denotes the error of the 2D pixel information, $\theta$ denotes a 3D joint angle, and $\beta$ denotes shape coefficient information.

Each of the imaging devices may include a fisheye lens.

The wearable device may be any one of augmented reality (AR) glass or a head-mounted display (HMD).

At least two of the imaging devices may be provided at a left end and a right end of the wearable device to each form a preset angle downward, and each of the at least two imaging devices may have a field of view (FoV) of a preset size.

In another general aspect, a wearable device configured to perform a method with 3D modeling of a wearer, the wearable device includes a plurality of imaging devices configured to obtain a plurality of images of the wearer, a memory configured to store therein computer-executable instructions, and a processor configured to execute the instructions by accessing the memory. The processor may be configured to generate a feature map for each of the images, obtain joint keypoint information corresponding to joint positions of the wearer and initial shape coefficient information associated with a shape of the wearer based on the feature map, for each of the images, determine a target 3D joint angle for 3D modeling of the wearer based on the joint keypoint information and the initial shape coefficient information, determine target shape coefficient information for 3D modeling of the wearer based on the joint keypoint information and the initial shape coefficient information, and obtain a 3D mesh of the wearer based on the target 3D joint angle and the target shape coefficient information. The joint keypoint information may include 2D pixel information and depth information.

The processor may be configured to obtain the 2D pixel information inferred based on the feature map and a first CNN model, obtain the depth information inferred based on the feature map and a second CNN model, and obtain the initial shape coefficient information through iterative regression on the feature map.

The processor may be configured to calculate an error of the 2D pixel information, calculate an error of the depth information, calculate a 3D joint angle error over time, calculate a total error of a 3D joint angle based on the error of the 2D pixel information, the error of the depth information, and the 3D joint angle error over time, and determine a 3D joint angle minimizing the total error to be the target 3D joint angle.

The processor may be configured to determine, to be the target shape coefficient information, shape coefficient information minimizing a value obtained by summating values output by inputting the 3D joint angle error over time to the error of the 2D pixel information.

Each of the imaging devices may include a fisheye lens.

The wearable device may be any one of AR glass and an HMD.

At least two of the imaging devices may be provided at a left end and a right end of the wearable device to each form a preset angle downward, and each of the at least two imaging devices may have an FoV of a preset size.

Other features and aspects will be apparent from the following detailed description, the drawings, and the claims.

Figure 1:
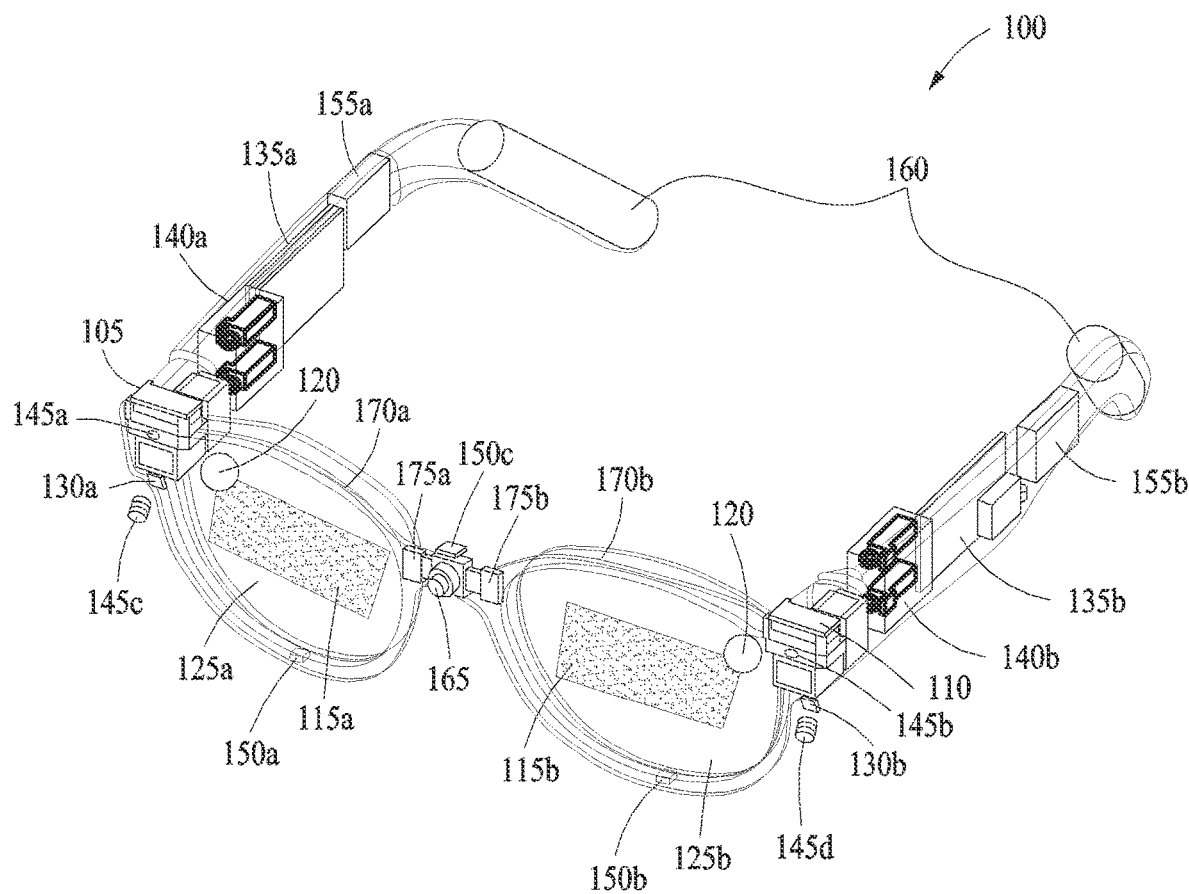
FIG. 1 illustrates an example of a structure of a wearable device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

The example embodiments described herein may be implemented in various types of products including, for example, a personal computer (PC), a laptop computer, a tablet computer, a smartphone, a television (TV), a smart home appliance, an intelligent vehicle, a kiosk, a wearable device, and the like. Hereinafter, the example embodiments will be described in detail with reference to the accompanying drawings, and like reference numerals in the drawings refer to like elements throughout.

FIG. 1 illustrates an example of a structure of a wearable device.

Referring to FIG. 1, a wearable device 100 may be augmented reality (AR) glass. The wearable device 100, which is a next-generation device displaying a virtual image (e.g., object information) on an actual image viewed by a user, may be worn on a face of the user and provide the user with an image associated with an AR service and/or virtual reality (VR) service. For this, the wearable device 100 may include a camera and a sensor that recognizes the surroundings of the wearable device 100 and an optical display that analyzes information obtained through the camera and the sensor and shows a virtual image on an actually viewed screen.

The wearable device 100 may perform vision processing, such as, for example, simultaneous localization and mapping (SLAM), head tracking, hand tracking, and surface reconstruction, based on data obtained using the camera and the sensor, and may overlap, onto an actual environment, information associated with the surroundings of the user to show it to the user.

In the wearable device 100, camera settings (e.g., a frame rate, an exposure time, and a gain) required for vision processing such as SLAM, head tracking, hand tracking, and surface reconstruction may differ for each vision processing process.

In an example, the wearable device 100 may include a first display 105, a second display 110, screen displays 115a and 115b, an optical input member 120, a first transparent member 125a, a second transparent member 125b, lighting portions 130a and 130b, a first printed circuit board (PCB) 135a, a second PCB 135b, a first hinge 140a, a second hinge 140b, first cameras 145a, 145b, 145c, and 145d, a plurality of microphones including a first microphone 150a, a second microphone 150b, and a third microphone 150c, a plurality of speakers including a first speaker 155a and a second speaker 155b, a battery 160, second cameras 175a and 175b, a third camera 165, and visors 170a and 170b.

In an example, a display (e.g., the first display 105 and the second display 110) may include, for example, a liquid crystal display (LCD), a digital mirror device (DMD), a liquid crystal on silicon (LCoS), an organic light-emitting diode (OLED), or a micro-light-emitting diode (mLED). For example, although not illustrated, when the display is provided as one of an LCD, a DMD, or an LCoS, the wearable device 100 may include a light source that emits light to a screen output area of the display. For another example, when the display emits light itself, that is, when the display is provided as one of an OLED or an mLED, the wearable device 100 may provide a virtual image of a desirable quality to the user even though it does not include a separate light source. In this example, when the display is implemented as the OLED or the mLED, the display may not require the light source, and the wearable device 100 may thus become lightweight. Hereinafter, the display that emits light itself will be referred to as a self-emissive display, and the following description will focus on the self-emissive display.

The display (e.g., the first display 105 and the second display 110) may include at least one mLED. For example, the mLED may represent red (R), green (G), and blue (B) through self-emission, and so small in size (e.g., 100 micrometers (μm) or less) that one chip thereof implements one pixel (e.g., one of R, G, and B). Thus, when the display is provided as the mLED, a high resolution may be provided without a backlight unit (BLU).

However, examples are not limited thereto, and one pixel may include R, G, and B, and one chip may include a plurality of pixels each including R, G, and B.

In an example, the display (e.g., the first display 105 and the second display 110) may include a display area including pixels for representing a virtual image, and light-receiving pixels (e.g., photo-sensor pixels) arranged among the pixels and configured to receive light reflected from eyes, convert the received light into electrical energy, and output the electrical energy.

The wearable device 100 may detect a gaze direction (e.g., a pupil movement) of the user through the light-receiving pixels. For example, the wearable device 100 may detect and track a gaze direction of a right eye of the user and a gaze direction of a left eye of the user through one or more light-receiving pixels included in the first display 105 and one or more light-receiving pixels included in the second display 110. The wearable device 100 may determine a position of a center of a virtual image based on the gaze directions (e.g., directions in which a pupil of the right eye and a pupil of the left eye of the user gaze at) of the right eye and the left eye of the user detected through the one or more light-receiving pixels.

In an example, a light emitted from the display (e.g., the first display 105 and the second display 110) may pass through a lens (not shown) and a waveguide and arrive at the screen display 115a formed on the first transparent member 125a disposed to face the right eye of the user and at the screen display 115b formed on the second transparent member 125b disposed to face the left eye of the user. For example, the light emitted from the display (e.g., the first display 105 and the second display 110) may pass through the waveguide and be reflected by a grating area formed on the optical input member 120 and the screen displays 115a and 115b to be transmitted to the eyes of the user. The first transparent member 125a and/or the second transparent member 125b may be formed by a glass plate, a plastic plate, or a polymer, and formed transparently or semi-transparently.

In an example, the lens (not shown) may be disposed in front of the display (e.g., the first display 105 and the second display 110). The lens may include a concave lens and/or a convex lens. The lens may include, for example, a projection lens or a collimation lens.

In an example, a screen display (e.g., the screen displays 115a and 115b) or a transparent member (e.g., the first transparent member 125a and the second transparent member 125b) may include a lens including a waveguide, or a reflective lens.

The waveguide may be formed with glass, plastic, or polymer, and include a grating structure in the form of a nanopattern formed on one surface inside or outside thereof, for example, in a polygonal form or curved form. A light incident on one end of the waveguide may be propagated inside the display waveguide through the nanopattern to be provided to the user. For example, the waveguide provided as a free-form prism may provide an incident light to the user through a mirror. The waveguide may include at least one of at least one diffractive element (e.g., a diffractive optical element (DOE) and a holographic optical element (HOE)) or reflective element (e.g., a reflection mirror). The waveguide may guide a light emitted from the display (e.g., the first display 105 and the second display 110) toward the eyes of the user using the at least one diffractive element or reflective element included in the waveguide.

According to various examples, the diffractive element may include the optical input member 120 and an optical output member (not shown). For example, the optical input member 120 may be an input grating area, and the optical output member may be an output grating area. The input grating area may function as an input end that diffracts or reflects a light output from the display (e.g., the first display 105 and the second display 110), for example, the mLED, to transmit the light to the transparent member (e.g., the first transparent member 150a and the second transparent member 150b) of the screen display (e.g., the screen displays 115a and 115b). The output grating area may function as an output end that diffracts or reflects the light transmitted to the transparent member (e.g., the first transparent member 150a and the second transparent member 150b) of the waveguide to the eyes of the user.

According to various examples, the reflective element may include a total reflection optical element or a total reflection waveguide for total internal reflection (TIR). The TIR may be, for example, a light guiding method that may form an incident angle to allow a light (e.g., a virtual image) input through the input grating area to be reflected 100% from one surface (a specific surface) of the waveguide and may allow the light to be transmitted 100% up to the output grating area.

In an example, an optical path of a light emitted from the display (e.g., the first display 105 and the second display 110) may be guided to the waveguide through the optical input member 120. A light moving inside the waveguide may be guided toward the eyes of the user through the optical output member. The screen displays 115a and 115b may be determined based on the light emitted toward the eyes.

In an example, the first cameras 145a, 145b, 145c, and 145d may include a camera used for three degrees of freedom (3DoF) and six degrees of freedom (6DoF) head tracking, hand detection and tracking, and gesture and/or space recognition. For example, the first cameras 145a, 145b, 145c, and 145d may include a global shutter (GS) camera to detect and track a movement of a head and a hand.

For example, as the first cameras 145a, 145b, 145c, and 145d, a stereo camera may be used for head tracking and space recognition, and cameras of the same specification and the same performance may be used. As the first cameras 145a, 145b, 145c, and 145d, a GS camera having a high performance (e.g., image dragging) may be used to detect and track a fine movement such as a fast hand movement and a finger movement.

According to various examples, as the first cameras 145a, 145b, 145c, and 145d, a rolling shutter (RS) camera may be used. The first cameras 145a, 145b, 145c, and 145d may perform a 6DoF space recognition function and a depth capturing-based SLAM function. The first cameras 145a, 145b, 145c, and 145d may perform a gesture recognition function to recognize a gesture performed by the user.

In an example, the second cameras 175a and 175b may be used to detect and track the pupils of the eyes of the user. The second cameras 175a and 175b may also be referred to as an eye-tracking (ET) camera. The second cameras 175a and 175b may track a gaze direction of the user. The wearable device 100 may allow a center of a virtual image projected onto the screen displays 115a and 115b to be disposed in a direction in which the pupils of the user gaze based on the gaze direction of the user.

As the second cameras 175a and 175b for tracking the gaze direction, a GS camera may be used to detect the pupils and track a fast movement of the pupils. The second cameras 175a and 175b may be installed respectively for the right eye and the left eye, and cameras of the same performance and specification may be used as the second cameras 175a and 175b for the right eye and the left eye.

In an example, the third camera 165 may also be referred to as a high-resolution (HR) camera or a photo-video (PV) camera, and include an HR camera. The third camera 165 may include a color camera having functions for obtaining a high-quality image, for example, an auto-focus (AF) function and an optical image stabilization (OIS) function. However, examples are not limited thereto, and the third camera 165 may include a GS camera or an RS camera.

In an example, at least one sensor (e.g., a gyro sensor an acceleration sensor, a geomagnetic sensor, a touch sensor an illuminance sensor, and/or a gesture sensor) and the first cameras 145a, 145b, 145c, and 145d may perform at least one function among 6DoF head tracking, movement detection and prediction (or pose estimation and prediction), gesture and/or space recognition, depth capturing-based SLAM functions.

In another example, the first cameras 145a, 145b, 145c, and 145d may be classified into a camera for head tracking and a camera for hand tracking.

In an example, the use of the lighting portions 130a and 130b may differ based on a position to which they are attached. For example, the lighting portions 130a and 130b may be attached, along with the first cameras 145a, 145b, 145c, and 145d installed around a hinge (e.g. the first hinge 140a and the second hinge 140b) connecting a frame and a temple or around a bridge connecting the frame. For example, when a GS camera is used to capture an image, the lighting portions 130a and 130b may be used as means for supplementing ambient brightness. For example, in a case in which detecting an object of which an image is to be captured is not readily performed due to a dark environment, a mixture of various light sources, or a reflected light, the lighting portions 130a and 130b may be used.

In an example, the lighting portions 130a and 130b attached around the frame of the wearable device 100 may be used as an assistant means for facilitating detection of an eye gaze when capturing an image of the pupils by the second cameras 175a and 175b. When the lighting portions 130a and 130b are used as the assistant means for detecting a gaze direction, they may include an infrared LED (IR LED).

In an example, a PCB (e.g., the first PCB 135a and the second PCB 135b) may include a processor (not shown) configured to control components of the wearable device 100, a memory (not shown), and a communication module (not shown). For example, the communication module may support establishment of a wired (or direct) communication channel or a wireless communication channel between the wearable device 100 and an external electronic device, and communication through the established communication channel. The PCB may transmit an electrical signal to the components included in the wearable device 100.

The communication module may operate independently of the processor, and include one or more communication processors that support wired (or direct) communication or wireless communication. In an example, the communication module may include a wireless communication module (e.g., a cellular communication module, a short-range wireless communication module, or a global navigation satellite system (GNSS) communication module) or a wired communication module (e.g., a local area network (LAN) communication module or a power line communication (PLC) module). A corresponding one of these communication modules may communicate with an external electronic device via a short-range communication network such as Bluetooth™, wireless-fidelity (Wi-Fi) direct, or infrared data association (IrDA), or a long-range communication network such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other.

The wireless communication module may support a 5G network after a 4G network, and a next-generation communication technology (e.g., a new radio (NR) access technology). The NR access technology may support enhanced mobile broadband (eMBB), massive machine type communications (mMTC), or ultra-reliable and low-latency communications (URLLC). The wireless communication module may support a high-frequency band (e.g., a mmWave band) to achieve a high data transmission rate, for example. The wireless communication module may support various technologies for securing performance on a high-frequency band, such as, for example, beamforming, massive multiple-input and multiple-output (MIMO), full dimensional MIMO (FD-MIMO), an array antenna, analog beamforming, or a large-scale antenna.

The wearable device 100 may further include an antenna module (not shown). The antenna module may transmit or receive a signal or power to or from the outside (e.g., an external electronic device) of the wearable device 100. In an example, the antenna module may include an antenna including a radiating element including a conductive material or a conductive pattern formed in or on a substrate (e.g., the first PCB 135a and the second PCB 135b). In an example, the antenna module may include a plurality of antennas (e.g., array antennas).

In an example, a plurality of microphones (e.g., the first microphone 150a, the second microphone 150b, and the third microphone 150c) may process an external sound signal into electrical audio data. The processed audio data may be used in various ways according to a function (or application) being performed (or executed) in the wearable device 100.

In an example, a plurality of speakers (e.g., the first speaker 155a and the second speaker 155b) may output audio data received from the communication module or stored in the memory.

In an example, the battery 160 may be provided as one or more batteries and may supply power to the components included in the wearable device 100.

The visors 170a and 170b may adjust an amount of a transmitted external light that is incident on the eyes of the user based on a transmittance. For example, the visors 170a and 170b may be disposed in front of or at the rear of the screen displays 115a and 115b. In this example, the front of the screen displays 115a and 115b may indicate an opposite direction of a side of the user wearing the wearable device 100, and the rear of the screen displays 115a and 115b may indicate a direction of the side of the user wearing the wearable device 100. The visors 170a and 170b may protect the screen displays 115a and 115b and adjust the amount of the transmitted external light.

For example, the visors 170a and 170b may include an electrochromic device that changes in its color according to applied power and adjusts a transmittance. Here, electrochromism may be a phenomenon in which a color changes as an oxidation-reduction reaction occurs by applied power. The visors 170a and 170b may adjust the transmittance of an external light using the electrochromic device changing the color.

For example, the visors 170a and 170b may include a control module and the electrochromic device. In this example, the control module may control the electrochromic device to adjust the transmittance of the electrochromic device.

Figure 2A:
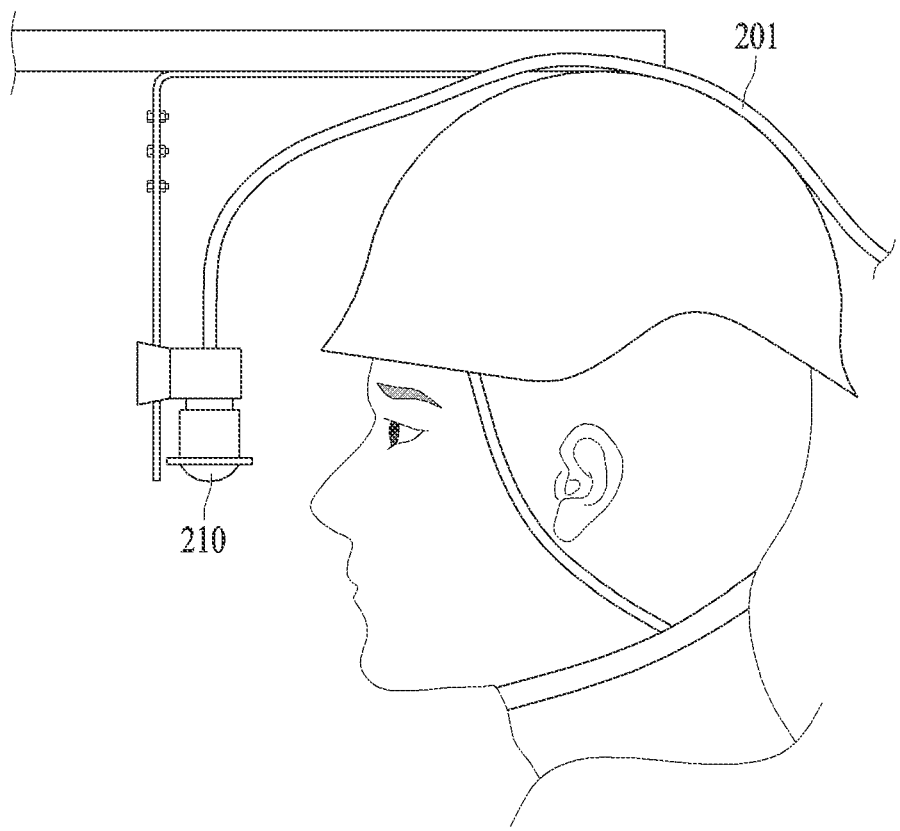
FIGS. 2A and 2B illustrate an example of a structural difference between a typical wearable device and a wearable device of an example embodiment for three-dimensional (3D) modeling of a body of a wearer.
Figure 2B:
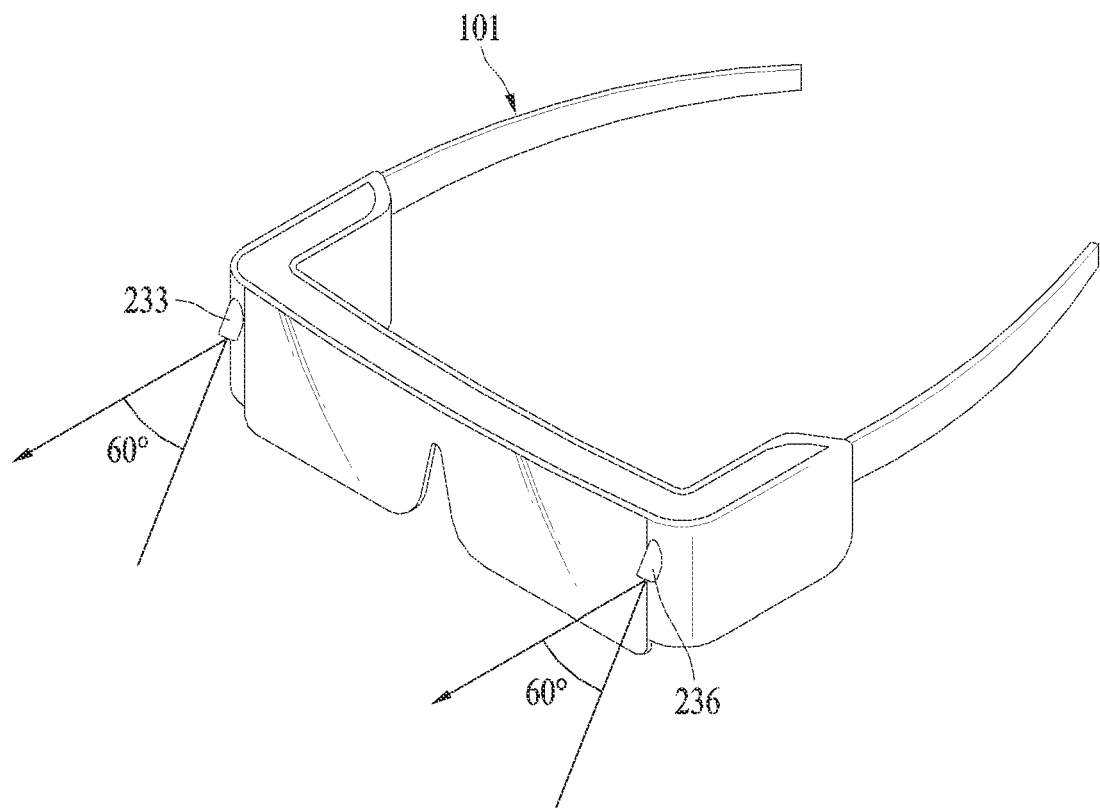

FIGS. 2A and 2B illustrate an example of a structural difference between a typical wearable device and a wearable device of an example embodiment for 3D modeling of a body of a wearer.

For 3D modeling of a human body, an image including all joints or almost all the joints of a target for 3D modeling may be used, and thus an image of the target may be captured at a remote distance. For this, a third imaging device or sensor may be used for 3D modeling of a human body, and a user may need to purchase expensive additional equipment. Thus, for user convenience, research is being conducted on a method of modeling a body of a wearer through a wearable device.

FIG. 2A illustrates an example of a typical wearable device 201 for 3D modeling of a body of a wearer. The wearable device 201 may include an imaging device 210 for 3D modeling of the body of the wearer. The wearable device 201 may perform 3D modeling on a body part, for example, a hand and a face, of which an image may be captured through the imaging device 210.

When the imaging device 210 is attached near the wearable device 201, an image of an area such as a hand in addition to a distal part (e.g., shoulder, elbow, and tiptoe) may not be captured, and the wearable device 201 may not perform 3D modeling on the whole body of the wearer.

To obtain an image including a greater portion of the body of the wearer of the wearable device 201, the wearable device 201 may be implemented in the form that the imaging device 210 is relatively remote from the wearer. However, when the wearable device 201 is implemented as illustrated in FIG. 2A, user convenience may be degraded due to the weight of the imaging device 210. Also, even when the wearable device 201 is implemented in the form that the size thereof increases and the imaging device 201 is included in the wearable device 201, user convenience may be degraded due to the increase in the size of the wearable device 201.

FIG. 2B illustrates an example of a wearable device 101 according to an example disclosed herein. The wearable device 101 may be provided in the form of AR glass and include at least a portion of the components of the wearable device 100 of FIG. 1. For a description of the components of the wearable device 100, reference may be made to what has been described above with reference to FIG. 1.

Figure 4A:
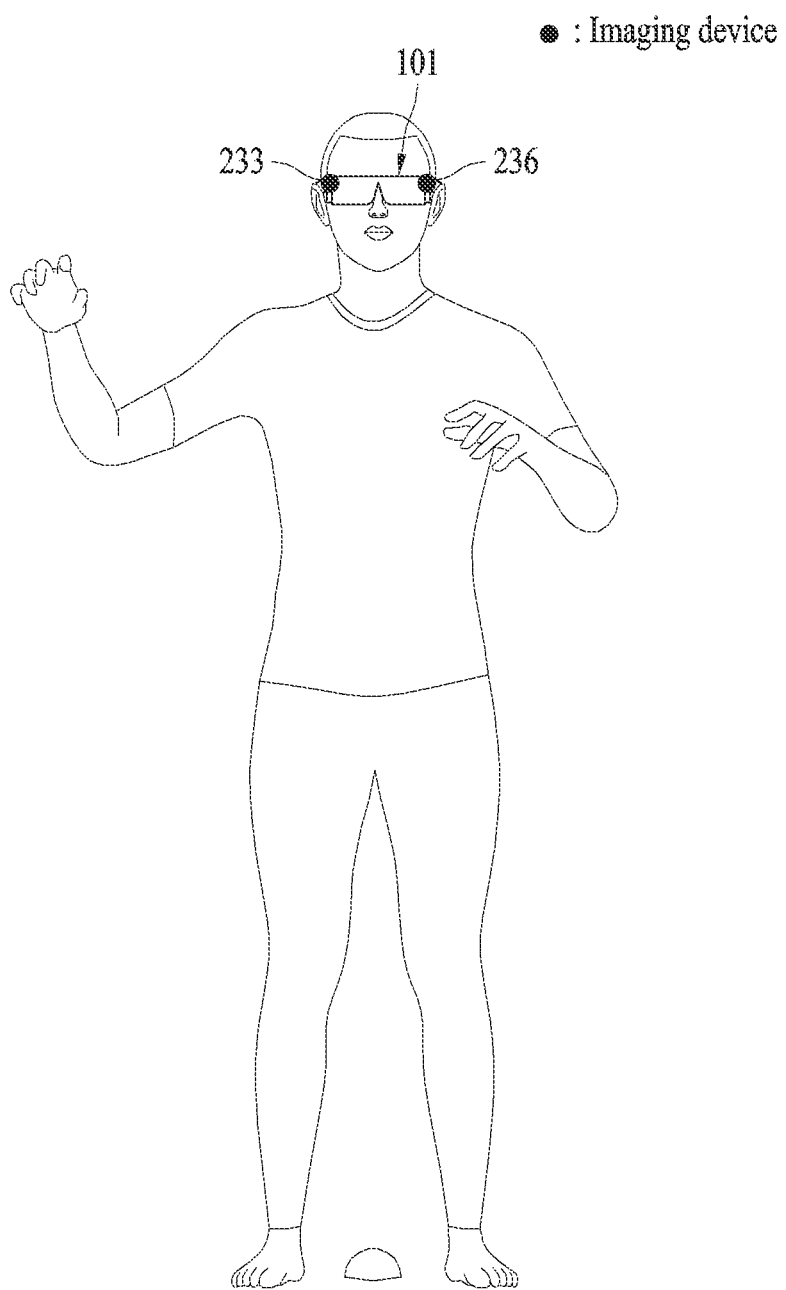
FIGS. 4A and 4B illustrate an example of obtaining a plurality of images of a wearer of a wearable device.

Although the wearable device 101 is illustrated as AR glass in FIGS. 1, 2B, and 4A, examples of which are not limited thereto, and the wearable device may also be provided in the form of a head-mounted display (HMD).

Unlike the wearable device 201 described above with reference to FIG. 2A, the wearable device 101 of FIG. 2B may include a plurality of imaging devices 233 and 236. Although the wearable device 100 is described above with reference to FIG. 1 as including a plurality of imaging devices, for example, the first camera 145a, 145b, 145c, and 145d, the second cameras 175a and 175b, and the third camera 165, the wearable device 101 of FIG. 2B may include a plurality of imaging devices, for example, the imaging devices 233 and 236, for 3D modeling of a wearer.

For example, the imaging devices provided in the wearable device 101 may be a stereo vision camera including a right imaging device 233 and a left imaging device 236. In this example, in addition to the right imaging device 233 and the left imaging device 236, the wearable device 101 may further include a plurality of imaging devices (e.g., the first camera 145a, 145b, 145c, and 145d, the second cameras 175a and 175b, and the third camera 165 of FIG. 1), for 3D modeling.

The right imaging device 233 and the left imaging device 236 may include a fisheye lens to capture an image of a wider area including up to a distal end of a body of the wearer. The two imaging devices 233 and 236 may be provided in the wearable device 101 such that a distance therebetween is approximately 20 centimeters (cm) and each has a preset angle (e.g., approximately 60 degrees (°)) downward to desirably capture an image of the body of the wearer.

Each of the imaging devices 233 and 236 may have a field of view (FoV) of a preset size, for example, 170° FoV.

A detailed configuration of the wearable device 101 of FIG. 2B will be described hereinafter with reference to FIG. 3.

Figure 3:
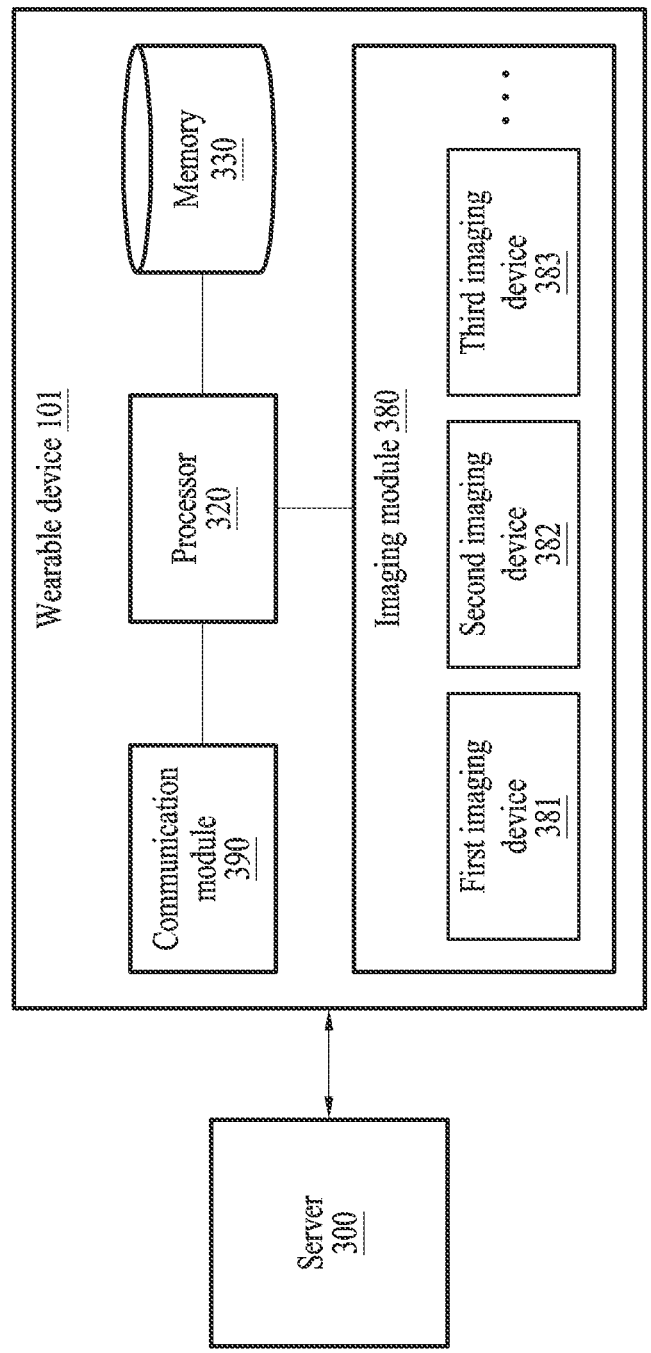
FIG. 3 illustrates an example of a configuration of a wearable device.

FIG. 3 illustrates an example of a configuration of the wearable device 101.

Referring to FIG. 3, the wearable device 101 may include a memory 330 storing therein computer-executable instructions, a processor 320 configured to access the memory 330 to execute the instructions, and an imaging module 380 including a plurality of imaging devices (e.g., a first imaging device 381, a second imaging device 382, and a third imaging device 383).

The processor 320 may process data received by a communication module 390 and data stored in the memory 330. A processor described herein, for example, the processor 320, may be a hardware-implemented data processing device having a physically structured circuit to execute desired operations. The desired operations may include, for example, codes or computer-executable instructions included in a program. The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The processor 320 may execute computer-readable code (e.g., software) stored in a memory (e.g., the memory 330) and instructions induced by the processor 320.

The memory 330 may store data received by the communication module 390 and data processed by the processor 320. For example, the memory 330 may store a program (or an application and software). The program to be stored may be a set of syntaxes coded for 3D modeling of a body of a wearer of the wearable device 101 based on a plurality of images obtained through the imaging module 380 to be executable by the processor 320.

The memory 330 may include at least one volatile memory, nonvolatile memory, random-access memory (RAM), flash memory, hard disk drive, and optical disc drive. The memory 330 may store an instruction set (e.g., software) for operating the wearable device 101. The instruction set operating the wearable device 101 may be executed by the processor 320.

The imaging devices 381, 382, and 383 of the imaging module 380 may be a stereo vision camera described above with reference to FIG. 2B, and include an image sensor. Although the imaging devices 381, 382, and 383 are illustrated as being included in the imaging module 380 of the wearable device 101 in FIG. 3, imaging devices may be implemented as being attachable to or detachable from the wearable device 101. For example, the imaging devices may be configured to obtain images for 3D modeling of the wearer of the wearable device 101 and transmit the obtained images to the wearable device 101. As described above about the imaging devices 233 and 236 with reference to FIG. 2B, the imaging devices 381, 382, and 383 may include a fisheye lens, and may be provided to form a preset angle downward at a left end and a right end of the wearable device 101. The imaging devices 381, 382, and 383 may each have an FoV of a preset size. An operation of obtaining a plurality of images by a plurality of imaging devices will be described in detail with reference to FIGS. 4A and 4B.

The communication module 390 may be connected to the processor 320 and the memory 330 to transmit and receive data. The communication module 390 may be connected to another external device to receive data therefrom. Hereinafter, "transmitting and receiving A" may indicate "transmitting and receiving information or data indicating A." In an example, the communication module 390 may be implemented as a circuitry in the wearable device 101. For example, the communication module 390 may include an internal bus and an external bus. For another example, the communication module 390 may be an element connecting the wearable device 101 to an external device or a server (e.g., a server 300). The communication module 390 may be an interface.

The communication module 390 may receive data from the external device or the server 300, and transmit the received data to the processor 320 and the memory 330. In an example, the processor 320 may communicate with the server 300 through the communication module 390.

The server 300 may perform 3D modeling on the body of the wearer of the wearable device 101 based on the images obtained through the imaging module 380. For example, when the wearable device 101 is not operable to perform 3D modeling due to its poor performance, the wearable device 101 may transmit the images to the server 300 through the communication module 390, and the server 300 may perform 3D modeling of the wearer of the wearable device 101 based on the received images. In this example, the server 300 may obtain a 3D mesh of the wearer, and the wearable device 101 may receive the 3D mesh through the communication module 390.

Hereinafter, a method for 3D modeling of a body of a wearer of the wearable device 101 will be described in detail with reference to FIGS. 4A through 9.

Figure 4B:
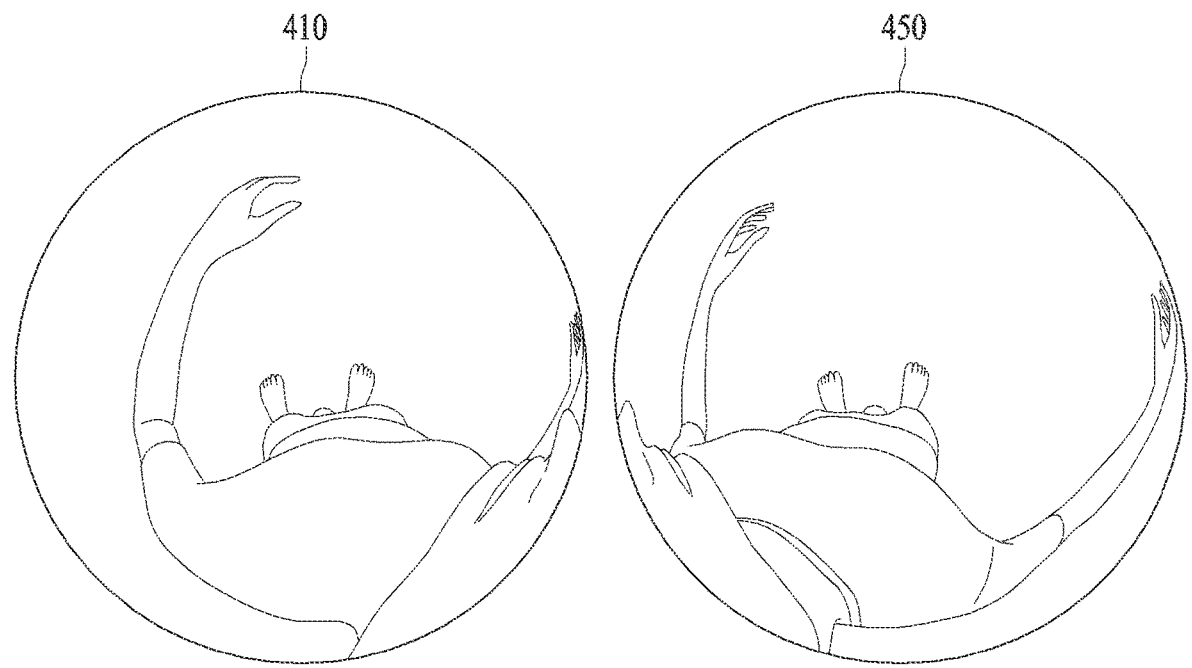

FIGS. 4A and 4B illustrate an example of obtaining a plurality of images of a wearer of a wearable device.

FIG. 4A illustrates a wearer wearing the wearable device 101 described above with reference to FIGS. 2A and 3. As described above with reference to FIGS. 2B and 3, the wearable device 101 may include the imaging devices 233 and 236, and the imaging devices 233 and 236 may be provided in the wearable device 101 to capture an image of a body of the wearer. For example, the imaging devices 233 and 236 may be provided respectively at a left end and a right end of the wearable device 101, each provided at an angle of approximately 60° downward, and each may have an FoV of approximately 170°.

FIG. 4B illustrates images obtained by the imaging devices 233 and 236 of FIG. 4A. An image 410 may be obtained by the imaging device 236 which is a left imaging device with respect to the wearer of FIG. 4A, and an image 450 may be obtained by the imaging device 233 which is a right imaging device with respect to the wearer of FIG. 4A. As described above with reference to FIG. 2B, the imaging devices 233 and 236 may include a fisheye lens, and thus obtain circular images (e.g., the images 410 and 450).

In an example, as a plurality of imaging devices captures an image of the wearer of the wearable device 101 that is a target for 3D modeling, images including a greater number of joints of the wearer may be obtained. For example, the images 410 and 450 may include a greater number of joints of the wearer than an image obtained by the imaging device 210 of the typical wearable device 201 of FIG. 2A for 3D modeling of a body of a wearer.

In an example, as a plurality of imaging devices captures an image of a wearer of the wearable device 101 in a way complementary to each other, the number of non-observed joints may be reduced. For example, when an image of the wearer is captured only by the left imaging device 236, a right shoulder joint of the wearer may not be included in the image as shown in the image 410. In this example, as the wearable device 101 obtains the image 450 by capturing an image of the wearer by the right imaging device 233 in addition to the left imaging device 236, the number of non-observed joints may be reduced, compared to an image of the wearer obtained only using a single imaging device.

The wearable device 101 described above with reference to FIG. 3 may perform 3D modeling of the wearer based on a plurality of images, for example, the images 410 and 450 of FIG. 4B. Hereinafter, an example of obtaining a 3D mesh of a wearer from a plurality of images of the wearer through 3D modeling will be described with reference to FIG. 5.

Figure 5:
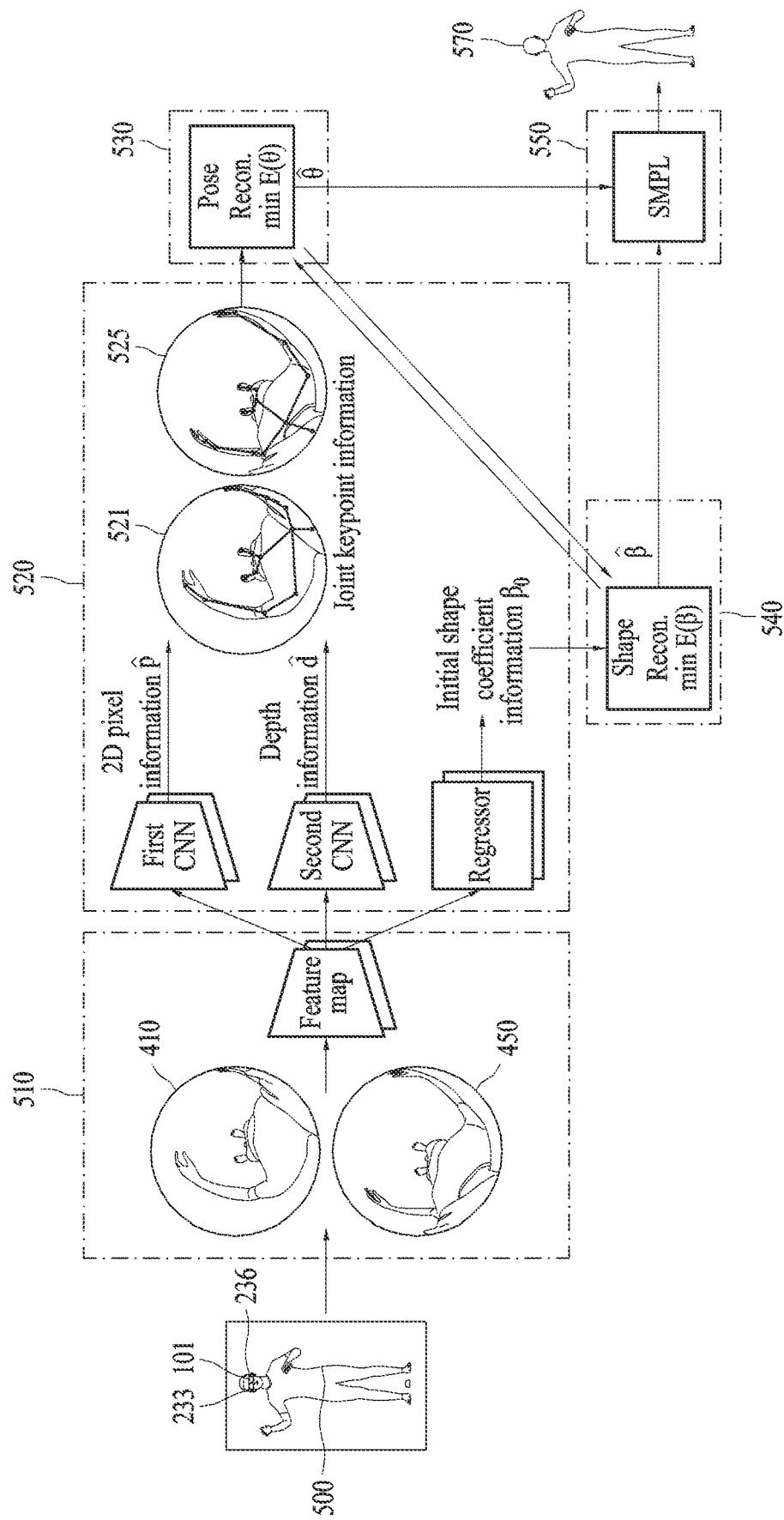
FIG. 5 illustrates an example of obtaining a 3D mesh of a wearer from a plurality of images of the wearer.

FIG. 5 illustrates an example of obtaining a 3D mesh of a wearer from a plurality of images of the wearer.

Referring to FIG. 5, the wearable device 101 described above with reference to FIG. 4A is worn on a wearer 500, and a 3D mesh 570 may be obtained through 3D modeling of the wearer 500. As described above with reference to FIG. 4B, a plurality of images of a wearer may be obtained by a plurality of imaging devices. For example, the left image 410 and the right image 450 illustrated in FIG. 4B may be obtained. Although the following description will be provided with the left image 410 and the right image 450 as an example, examples are not limited thereto.

For example, as described above with reference to FIGS. 2B through 4B, a plurality of images may be obtained by a plurality of imaging devices, and a 3D mesh of a wearer may be obtained based on the obtained images.

In operation 510, a feature map may be generated from the images 410 and 450. The feature map may be generated based on various convolutional neural networks (CNNs). For example, the feature may be generated based on at least one of Mobilenet, Googlenet, and Resnet.

In operation 520, based on the feature map, joint keypoint information corresponding to joint positions of the wearer 500 of the wearable device 101 and initial shape coefficient information corresponding to a shape of the wearer 500 may be obtained. The joint keypoint information may include two-dimensional (2D) pixel information and depth information.

The joint keypoint information and the initial shape coefficient information may be obtained for each of a plurality of images. For example, data 521 including information associated with a 3D position and a depth of joints may be obtained based on 2D pixel information and depth information obtained from the left image 410, and data 525 including information associated with a 3D position and a depth of joints may be obtained based on 2D pixel information and depth information obtained from the right image 450. The initial shape coefficient information may also be obtained for each of the images.

In an example, 2D pixel information p, depth information d, and initial shape coefficient information $\beta_0$ may be obtained differently. For example, the 2D pixel information $\beta$ may be obtained based on the feature map and a first CNN model, the depth information d may be obtained based on the feature map and a second CNN model, and the initial shape coefficient information $\beta_0$ may be obtained through iterative regression on the feature map.

In operation 530, 3D pose recostruction may be performed on the wearer 500. In an example, in operation 530, optimization may be performed on a 3D joint angle $\theta$ which is a 3D angle formed by joints of the wearer 500, and a target 3D joint angle $\hat{\theta}$ for 3D modeling of the wearer 500 may be determined. For example, in operation 530, a 3D joint angle error may be calculated based on the 2D pixel information, the depth information, and the initial shape coefficient information obtained in operation 520, and a 3D joint angle minimizing the error may be determined to be the target 3D joint angle $\hat{\theta}$.

In operation 540, 3D shape reconstruction may be performed on the wearer 500. In an example, optimization may be performed on a shape coefficient $\beta$ associated with a shape of the wearer 500, and a target shape coefficient $\hat{\beta}$ for 3D modeling of the wearer 500 may be determined. For example, in operation 540, a shape coefficient error may be calculated based on the 2D pixel information, the depth information, and the initial shape coefficient information obtained in operation 520, and a shape coefficient minimizing the error may be determined to be the target shape coefficient $\hat{\beta}$.

In operation 550, the target 3D joint angle $\hat{\theta}$ and the target shape coefficient R may be input to a skinned multi-person linear model (SMPL) for 3D modeling of a human body, and the 3D mesh 570 of the wearer 500 may be output.

Hereinafter, the operations described above with reference to FIG. 5 to obtain a 3D mesh will be described in detail in relation to the wearable device 101 with reference to FIGS. 6 through 9.

Figure 6:
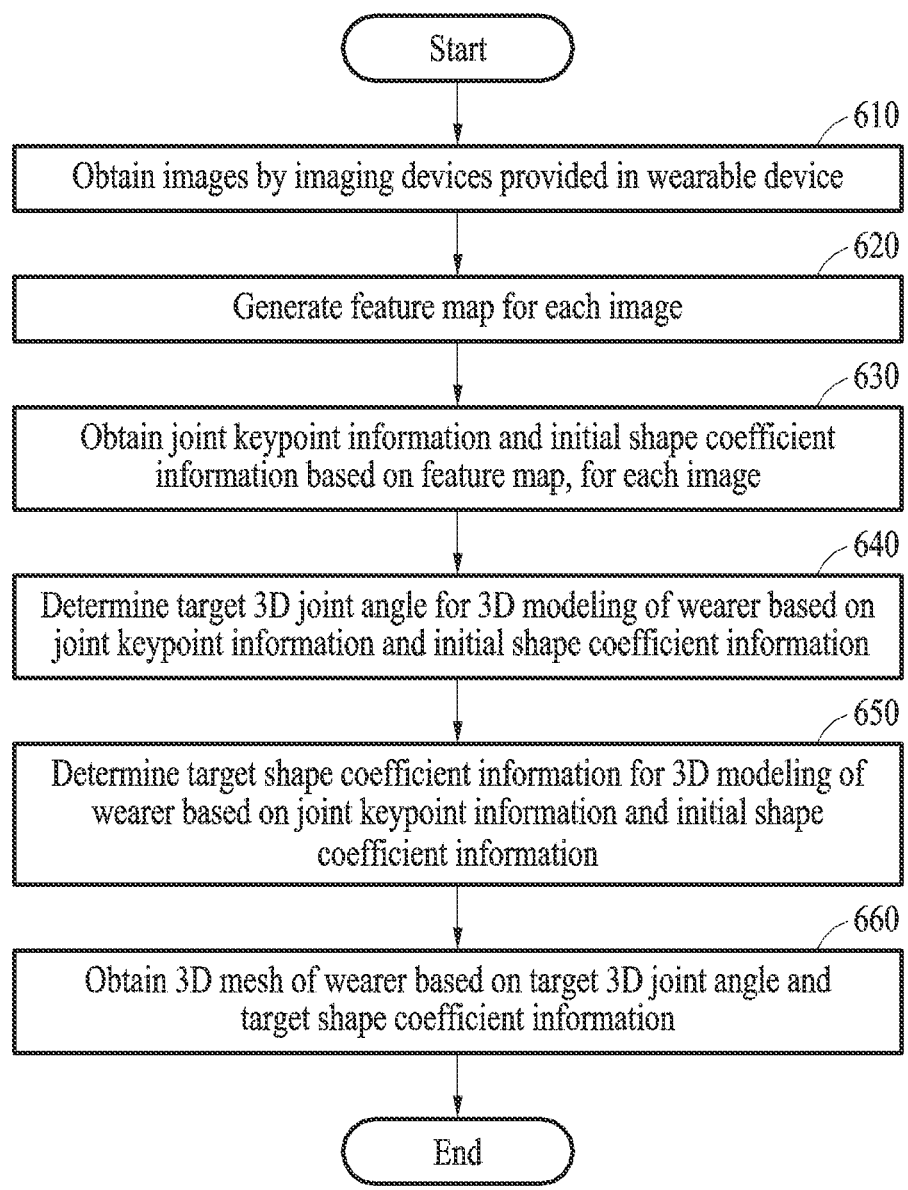
FIG. 6 illustrates an example of a method for 3D modeling of a body of a wearer of a wearable device.

FIG. 6 illustrates an example of a method for 3D modeling of a body of a wearer of a wearable device.

Operations 610 through 660 to be described hereinafter with reference to FIG. 6 may be performed by the processor 320 of the wearable device 101 described above with reference to FIGS. 2B and 3, and reference may be made to what has been described above with reference to FIGS. 1 through 5 and a repeated description will be omitted for conciseness.

In operation 610, the processor 320 may obtain a plurality of images (e.g., the left image 410 and the right image 450 of FIG. 4B) by a plurality of imaging devices (e.g., the left imaging device 236 and the right imaging device 233 with respect to a wearer of FIGS. 2B and 4A) provided in the wearable device 101.

In operation 620, the processor 320 may generate a feature map for each of the images. Operation 620 may correspond to operation 510 described above with reference to FIG. 5. For example, the feature map may be generated for each of the images based on at least one of Mobilenet, Googlenet, and Resnet.

In operation 630, the processor 320 may obtain joint keypoint information and initial shape coefficient information based on the feature map for each of the images. Operation 630 may correspond to operation 520 described above with reference to FIG. 5. As described above about operation 520, the processor 320 may obtain 2D pixel information p, depth information d, and initial shape coefficient information $\beta_0$ for each of the images.

For example, the imaging devices may include the left imaging device 236 provided on a left side of the wearable device 101 and the right imaging device 233 provided on a right side of the wearable device 101. In this example, in operation 630, the processor 320 may obtain 2D pixel information $\hat{p}_l$, depth information $\hat{d}_l$, and initial shape coefficient information $\beta_l$ from the left image 410, and the processor 320 may obtain 2D pixel information $\hat{p}_r$, depth information $\hat{d}_r$, and initial shape coefficient information $\beta_r$ from the right image 450.

Operation 630 of obtaining, by the processor 320, the joint keypoint information and the initial shape coefficient information based on the feature map for each image will be described in detail with reference to FIG. 7.

In operation 640, the processor 320 may determine a target 3D joint angle for 3D modeling of the wearer based on the joint keypoint information and the initial shape coefficient information obtained for each of the images. Operation 640 may correspond to operation 530 described above with reference to FIG. 5. As described above about operation 530, the processor 320 may determine a target 3D joint angle $\hat{\theta}$ for 3D modeling of the wearer by optimizing a 3D joint angle $\theta$ which is a 3D angle formed by joints of the wearer. For example, in operation 640, a 3D joint angle error may be calculated based on the 2D pixel information, the depth information, and the initial shape coefficient information obtained in operation 630, and a 3D joint angle minimizing the error may be determined to be the target 3D joint angle $\hat{\theta}$. Operation 640 of determining a target 3D joint angle by the processor 320 will be described in detail with reference to FIG. 8.

In operation 650, the processor 320 may determine target shape coefficient information for 3D modeling of the wearer based on the joint keypoint information and the initial shape coefficient information obtained for each of the images. In an example, the initial shape coefficient information used to determine the target shape coefficient information may be a mean of the initial shape coefficient information obtained for the respective images.

For example, as described above with reference to FIG. 5, when the imaging devices of the wearable device 101 include the left imaging device 236 provided on the left side of the wearable device 101 and the right imaging device 233 provided on the right side of the wearable device 101, the initial shape coefficient information $\beta_0$ may be a mean of the initial shape coefficient information $\beta_l$ obtained from the left image 410 and the initial shape coefficient information $\beta_r$ obtained from the right image 450.

Operation 650 may correspond to operation 540 described above with reference to FIG. 5. As described above about operation 540, the processor 320 may determine a target shape coefficient $\beta$ for 3D modeling of the wearer by optimizing a shape coefficient $\beta$ associated with a shape of the wearer. For example, in operation 650, a shape coefficient error may be calculated based on the 2D pixel information, the depth information, and the initial shape coefficient information obtained in operation 630, and a shape coefficient minimizing the error may be determined to the target shape coefficient $\hat{\beta}$. Operation 650 of determining target 3D shape coefficient information by the processor 320 will be described in detail with reference to FIG. 9.

In operation 660, the processor 320 may obtain a 3D mesh (e.g., the 3D mesh 570 of FIG. 5) of the wearer based on the target 3D joint angle $\hat{\theta}$ determined in operation 640 and the target shape coefficient information $\hat{\beta}$ determined in operation 650. For example, the 3D mesh of the wearer may be obtained by inputting the target 3D joint angle $\hat{\theta}$ and the target shape coefficient information $\hat{\beta}$ to an SMPL that outputs vertices using $\theta$ and $\beta$ as an input.

Figure 7:
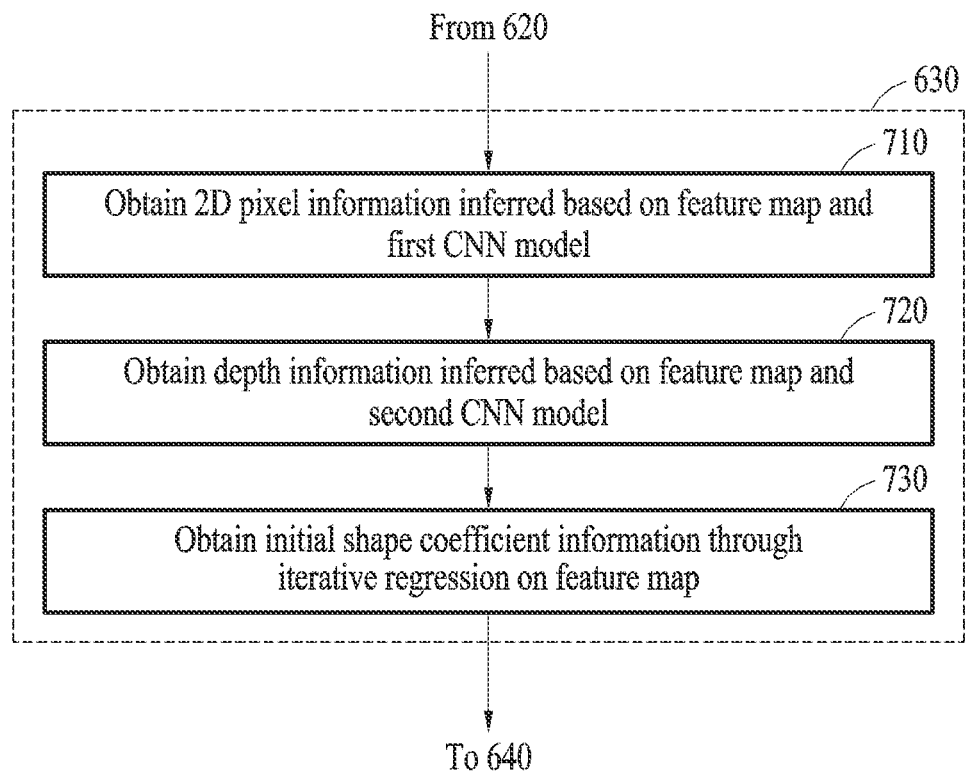
FIG. 7 illustrates an example of obtaining joint keypoint information and initial shape coefficient information.

FIG. 7 illustrates an example of obtaining joint keypoint information and initial shape coefficient information.

Operations 710 through 730 to be described hereinafter with reference to FIG. 7 may be performed by the processor 320 of the wearable device 101 described above with reference to FIG. 3, and reference may be made to what has been described above with reference to FIGS. 1 through 6 and a repeated description will be omitted for conciseness.

In an example, operations 710 through 730 may correspond to an operation (e.g., operation 630) described above with reference to FIG. 6 of obtaining joint keypoint information and initial shape coefficient information based on a feature map.

As described above about operation 520 with reference to FIG. 5, the processor 320 may differently obtain 2D pixel information $\hat{p}$, depth information $\hat{d}$, and initial shape coefficient information $\beta_0$ in operations 710 through 730.

In operation 710, the processor 320 may obtain the 2D pixel information $\hat{p}$ for each of a plurality of images based on a feature map and a first CNN model.

In operation 720, the processor 320 may obtain the depth information d for each of the images based on the feature map and a second CNN model identical to or different from the first CNN model.

In operations 710 and 720 of obtaining 2D pixel information and depth information by the processor 320, a heatmap may be used. For example, the processor 320 may generate a feature map for each of the images, and generate a heatmap $H_{2D}$ for each joint of the feature map. For example, when the number of joints to be inferred is five, five heatmaps may be generated for a single image (e.g., the left image 410). A pixel value normalized for each heatmap may correspond to a probability, and a point having a highest probability in the five heatmaps may be obtained as the 2D pixel information p. Also, for the depth information, the processor 320 may generate a heatmap $H_{1D}$ for each joint, and obtain a point having a highest probability in the heatmaps as the depth information d.

In operation 730, the processor 320 may obtain the initial shape coefficient information $\beta_0$ for each of the images through iterative regression on the feature map. As described above about operation 650 with reference to FIG. 6, initial shape coefficient information may be obtained for an initial value for optimizing shape coefficient information. A shape coefficient associated with a body shape of the wearer may not change even when images are input as time passes, and a target shape coefficient $\hat{\beta}$ may be obtained through the optimization of the shape coefficient.

In an example, for an optimization process to be described with reference to FIG. 9, shape coefficient information of an immediately previous frame may be used, and thus shape coefficient information of a first frame, i.e., the initial shape coefficient information, may be used. The processor 320 may obtain the initial shape coefficient information by performing iterative regression only on the first frame in operation 730, and obtain target shape coefficient information by performing, on a subsequent frame, the optimization process to be described with reference to FIG. 9.

While the processor 320 is obtaining the 2D pixel information $\hat{p}$, the depth information $\hat{d}$, and the initial shape coefficient information $\beta_0$ in operations 710 through 730, each parameter ($\hat{p}$, $\hat{d}$, and $\beta_0$) may be updated through deep learning-based training, and a loss function L in the training may be defined as Equation 1 below. The training may be construed as a process of continuously updating each parameter to minimize the loss function L represented below. The loss function L may include an error of heatmap information associated with 2D pixel information, an error of heatmap information associated with depth information, and an error associated with shape coefficient information, as represented by Equation 1 below.

$$L = \|H_{2D} - \hat{H}_{2D}\|_2^2 + w_1\|H_{1D} - \hat{H}_{1D}\|_2^2 + w_2\|\beta - \hat{\beta}\|_2^2 \qquad \text{Equation 1:}$$

In Equation 1, L denotes a loss function for all three factors-2D pixel information, depth information, and initial shape coefficient information. $H_{2D}$ denotes a ground truth of heatmap information associated with the 2D pixel information. $H_{1D}$ denotes a ground truth of heatmap information associated with the depth information. $\beta$ denotes a ground truth of shape coefficient information. $\hat{H}_{2D}$ denotes an inferred value of the heatmap information associated with the 2D pixel information, s and $H_{1D}$ denotes an inferred value of the heatmap information associated with the depth information. $\hat{\beta}$ denotes an inferred value of the shape coefficient information. $w_1$ and $w_2$ denote adjustable hyperparameters, and $\|\|_2^2$ is a square of an L2 norm which denotes a sum of squares of respective components.

The ground truths of the respective parameters may be stored in a memory (e.g., the memory 330 of FIG. 3). For example, a ground truth of heatmap information may be information corresponding to a single peak in the heatmap information, and a ground truth of a shape coefficient may be shape coefficient information associated with a body of a wearer that is previously examined.

The training may be implemented in various ways. For example, the training may be performed by freezing, one by one, the 2D pixel information, the depth information, and the shape coefficient information, and fine tuning may then be performed. In addition, $w_1$ and $w_2$ are adjustable hyperparameters, and the processor 320 may perform the training by adjusting a scale of each error.

Figure 8:
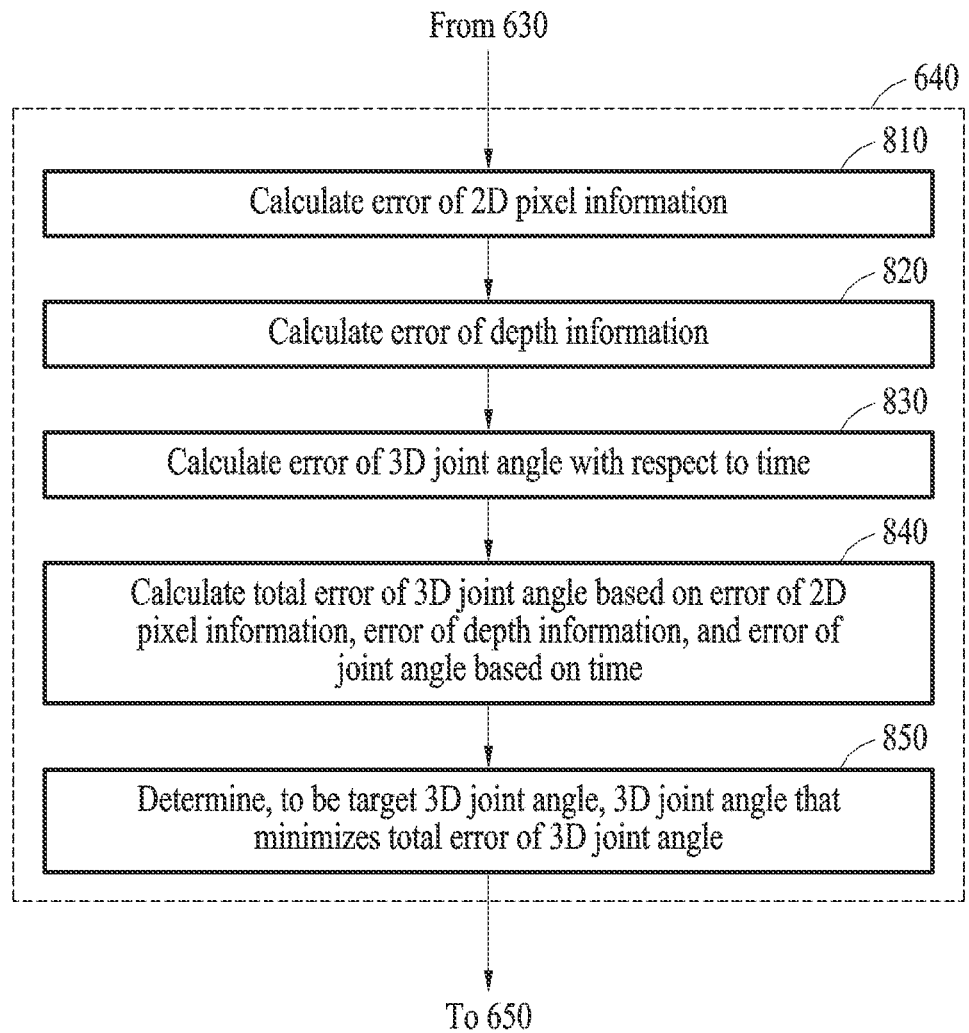
FIG. 8 illustrates an example of determining a target 3D joint angle.

FIG. 8 illustrates an example of determining a target 3D joint angle.

Operations 810 through 850 to be described hereinafter with reference to FIG. 8 may be performed by the processor 320 of the wearable device 101 described above with reference to FIG. 3, and reference may be made to what has been described above with reference to FIGS. 1 through 7 and a repeated description will be omitted for conciseness.

In an example, operations 810 through 850 may correspond to an operation (e.g., operation 640) of determining a target 3D joint angle described above with reference to FIG. 6.

A target 3D joint angle may be determined based on Equation 2 below in operations 810 through 850. The following description of operations 810 through 850 may correspond to a description of Equation 2.

$$\hat{\theta} = \min(E_{2D} + a\, E_{dist} + b\, E_{temp}) \quad \text{Equation 2:}$$

In Equation 2, $\hat{\theta}$ denotes a target 3D joint angle, $E_{2D}$ denotes an error of 2D pixel information, $E_{dist}$ denotes an error of depth information, $E_{temp}$ denotes a 3D joint angle error over time, and a and b denote adjustable hyperparameters.

In operation 810, the processor 320 may calculate an error $E_{2D}$ of 2D pixel information. For example, as described above with reference to FIG. 5, when a plurality of imaging devices of the wearable device 101 includes the left imaging device 236 provided on a left side of the wearable device 101 and the right imaging device 233 provided on a right side of the wearable device 101, the error $E_2D$ of the 2D pixel information may be calculated based on Equation 3.

$$E_{2D} = \sum_i \left\| v_{li}\left(\prod_l (X_i(\theta, \beta_{t-1})) - \hat{p}_{li}\right) \right\|_2^2 + \left\| v_{ri}\left(\prod_r (X_i(\theta, \beta_{t-1})) - \hat{p}_{ri}\right) \right\|_2^2 \quad \text{Equation 3}$$

In Equation 3, $E_{2D}$ denotes an error of 2D pixel information, $\theta$ denotes a 3D joint angle, $\beta$ denotes shape coefficient information, $X_i$ denotes 3D position information of an ith joint in an SMPL that outputs vertices using $\theta$ and $\beta$ as an input. $\Pi_l$ denotes a function for projection to a position at which the left imaging device 236 is provided, and $\Pi_r$ denotes a function for projection to a position at which the right imaging device 233 is provided. $\hat{p}_r$ denotes 2D pixel information of the ith joint in the image 410 obtained by the left imaging device 236, and $\hat{p}_{ri}$ denotes 2D pixel information of the ith joint in the image 450 obtained by the right imaging device 233. $v_{li}$ denotes information as to whether the ith joint is observed in the image 410 obtained by the left imaging device 236, and is 1 when it is observed and is 0 when it is not observed. $v_{ri}$ denotes information as to whether the ith joint is observed in the image 450 obtained by the right imaging device 233, and is 1 when it is observed and is 0 when it is not observed. In addition, $\|\cdot\|_2^2$ is a square of an L2-norm that denotes a sum of squares of respective components.

In operation 820, the processor 320 may calculate an error $E_{dist}$ of depth information. For example, as described above with reference to FIG. 5, when a plurality of imaging devices of the wearable device 101 includes the left imaging device 236 provided on a left side of the wearable device 101 and the right imaging device 233 provided on a right side of the wearable device 101, the error $E_{dist}$ of the depth information may be calculated by adding an error $E_{dist\_l}$ of left depth information and an error $E_{dist\_r}$ of right depth information. In this example, the error $E_{dist\_l}$ of the left depth information may be calculated based Equation 4, and the error $E_{dist\_r}$ of the right depth information may be calculated based on Equation 5.

$$E_{dist\,l} = \sum_i \left\| v_{li}\left(dist_l(X_i(\theta, \beta_{t-1})) - dist_l(X_0(\theta, \beta_{t-1})) - (\hat{d}_{li} - \hat{d}_{l0})\right) \right\|_2^2 \quad \text{Equation 4}$$

In Equation 4, $E_{dist\_l}$ denotes an error of left depth information, $\theta$ denotes a 3D joint angle, $\beta$ denotes shape coefficient information, $X_i$ denotes 3D position information of an ith joint in an SMPL that outputs vertices using $\theta$ and $\beta$ as an input, $dist_l$ denotes joint depth information in the SMPL in the image 410 obtained by the left imaging device 236, and $X_0$ denotes 3D position information of a reference joint (e.g., navel or pelvis) in the SMPL. $v_{li}$ denotes information as to whether the ith joint is observed in the image 410 obtained by the left imaging device 236, and is 1 when it is observed and is 0 when it is not observed. $\hat{d}_{li}$ denotes depth information of the ith joint in the image 410 obtained by the left imaging device 236, and $\hat{d}_{l0}$ denotes an initial value of the depth information of the ith joint in the image 410 obtained by the left imaging device 236. $\|\cdot\|_2^2$ is a square of an L2-norm that denotes a sum of squares of respective components.

$$E_{dist\,r} = \sum_i \left\| v_{ri}\left(dist_r(X_i(\theta, \beta_{t-1})) - dist_{ri}(X_0(\theta, \beta_{t-1})) - (\hat{d}_{ri} - \hat{d}_{r0})\right) \right\|_2^2 \quad \text{Equation 5}$$

In Equation 5, $E_{dist\_r}$ denotes an error of right depth information, $\theta$ denotes a 3D joint angle, $\beta$ denotes shape coefficient information, $X_i$ denotes 3D position information of an ith joint in an SMPL that outputs vertices using $\theta$ and $\beta$ as an input, $dist_r$ denotes joint depth information in the SMPL in the image 450 obtained by the right imaging device 233, and $X_0$ denotes 3D position information of a reference joint in the SMPL. $v_{ri}$ denotes information as to whether the ith joint is observed in the image 450 obtained by the right imaging device 233, and is 1 when it is observed and is 0 when it is not observed. $\hat{d}_{ri}$ denotes depth information of the ith joint in the image 450 obtained by the right imaging device 233, and $\hat{d}_{r0}$ denotes an initial value of the depth information of the ith joint in the image 450 obtained by the right imaging device 233. $\|\cdot\|_2^2$ is a square of an L2-norm that denotes a sum of squares of respective components.

In operation 830, the processor 320 may calculate a 3D joint angle error $E_{temp}$ with respect to time. The 3D joint angle error $E_{temp}$ with respect to time may be calculated based on Equation 6.

$$E_{temp} = \|\theta - \theta_{t-1}\|_2^2 \quad \text{Equation 6:}$$

In Equation 6, $E_{temp}$ denotes a 3D joint angle error with respect to time. $\theta$ denotes a 3D joint angle, and $\theta_{t-1}$ denotes a 3D joint angle in an immediately previous frame. $\|\cdot\|_2^2$ is a square of an L2-norm that denotes a sum of squares of respective components.

In an example, the processor 320 may perform normalization such that there is no great difference from the previous frame based on Equation 6.

Referring to Equations 3, 4, and 5 above, information (e.g., $v_{li}$ or $v_{ri}$) as to whether a joint is observed in each of a plurality of images may be included. Thus, even when there is a non-observed joint in one of the images, corresponding information may be applied to 3D modeling of a wearer when the joint is observed in another one of the images.

Referring to Equations 3, 4, and 5 above, even when there is a joint that is not observed in all the images, a position of the joint may be inferred based on shape coefficient information (e.g., $\beta_{t-1}$). For example, when a tiptoe is included in at least one of the images even though a knee joint is not included in all the images, a body shape, for example, a bone length, of the wearer may be determined based on shape coefficient information p, and thus a position of the knee joint may be inferred.

Referring to Equation 6 above, even when a distal end such as a tiptoe is not observed, it may be inferred through an immediately previous frame.

Referring to Equations 4 and 5 above, an error may be calculated based on a relative distance from 3D position information $X_0$ of a reference joint (e.g., navel or pelvis), and thus an error due to a position of an imaging device (e.g., 233 and 236) may be reduced.

In operation 840, the processor 320 may calculate a total error of a 3D joint angle based on the error $E_2D$ of the 2D pixel information, the error $E_{dist}$ of the depth information, and the 3D joint angle error $E_{temp}$ over time. For example, as described above with reference to Equation 2, the processor 320 may determine the total error of the 3D joint angle to be $E_{2D}+aE_{dist}+bE_{temp}$.

In operation 850, the processor 320 may determine, to be a target 3D joint angle $\hat{\theta}$, a 3D joint angle minimizing the total error of the 3D joint angle. For example, the processor 320 may determine the target 3D joint angle based on Equation 2 above.

Figure 9:
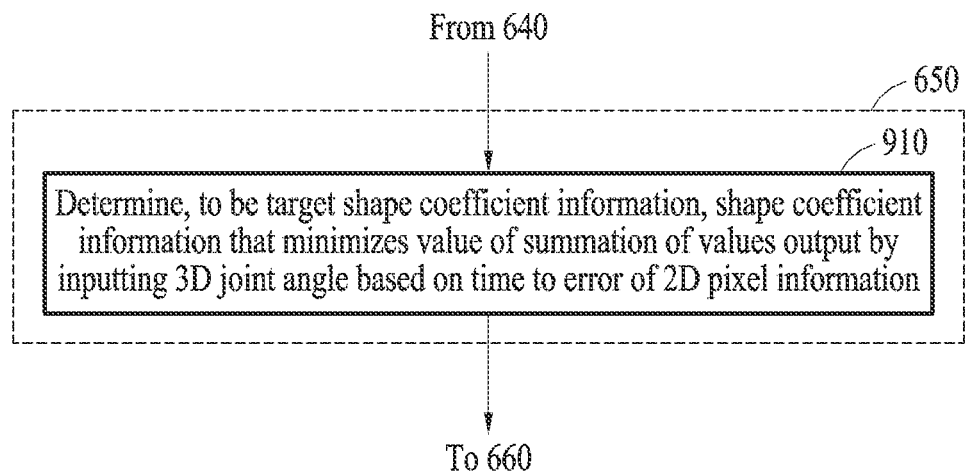
FIG. 9 illustrates an example of determining target shape coefficient information.

FIG. 9 illustrates an example of determining target shape coefficient information.

Operation 910 to be described hereinafter with reference to FIG. 9 may be performed by the processor 320 of the wearable device 101 described above with reference to FIG. 3, and reference may be made to what has been described above with reference to FIGS. 1 through 8 and a repeated description will be omitted for conciseness.

In an example, operation 910 may correspond to an operation (e.g., operation 650) of determining target shape coefficient information described above with reference to FIG. 6.

In operation 910, the processor 320 may determine, to be target shape coefficient information, shape coefficient information that minimizes a value obtained by summating values output by inputting, to an error of 2D pixel information, a 3D joint angle error over time. For example, the target shape coefficient information may be determined based on Equation 7.

$$\hat{\beta} = \min\left(\sum_t E_{2D}(\theta_t, \beta)\right)$$ Equation 7

In Equation 7, $\hat{\beta}$ denotes target shape coefficient information, $E_{2D}$ denotes an error of 2D pixel information in Equations 2 and 3, $\theta_t$ denotes a 3D joint angle over time, and p denotes shape coefficient information.

As described above about operation 630 with reference to FIG. 6, for the shape coefficient information $\beta$, the processor 320 may obtain initial shape coefficient information through iterative regression performed only on a first frame. For subsequent frames, the processor 320 may optimize the shape coefficient information based on Equation 7.

In an example, only the initial shape coefficient information of the first frame may be obtained based on the iterative regression, and for the subsequent frames, the optimization may be performed based on an error including an SMPL ($X_i$ in Equation 3) such as $E_{2D}$ in Equation 7 and a 3D joint angle $\theta_t$ with respect to time. Thus, a more accurate target shape coefficient R may be determined.

The shape coefficient information $\beta$ is a parameter having an eigenvalue for each wearer of the wearable device 101, and may be desirable to be robust against a pose of a wearer to improve the accuracy thereof. According to Equation 7, by designing such that a sum of errors output by inputting the 3D joint angle $\theta_t$ with respect to time to the error $E_{2D}$ of the 2D pixel information is minimized, the target shape coefficient information R robust against a change in a pose, i.e., a change in a joint angle based on time, may be determined.

As described above about operation 660 with reference to FIG. 6, the processor 320 may obtain a 3D mesh (e.g., the 3D mesh 570 of FIG. 5) of the wearer based on the target 3D joint angle $\hat{\theta}$ determine through operations 810 through 850 described above with reference to FIG. 8 and on the target shape coefficient information $\hat{\beta}$ determined through operation 910 described above with reference to FIG. 9. For example, the 3D mesh of the wearer may be obtained by inputting the target 3D joint angle $\hat{\theta}$ and the target shape coefficient information R to the SMPL that outputs vertices using $\theta$ and $\beta$ as an input.

The 3D mesh of the wearer may be used in various fields of application. The wearer may use the 3D mesh as his/her avatar at a video conference or in AR. The 3D mesh may also be used for an interaction between virtual objects or an interaction with a counterpart through telepresence.

Through the wearable device 101, image capturing (or imaging), 3D modeling, motion tracking, or the like may be performed in a single device without additional equipment. Through the wearable device 101, a user may thus perform 3D modeling on his/her appearance and/or movements without being restricted by space or place.

The wearable device, and other devices, apparatuses, units, modules, and components described herein with respect to FIGS. 1, 2B, 3, and 4A are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller.

One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A processor-implemented method with three-dimensional (3D) modeling of a wearer of a wearable device, comprising:
    generating a feature map for each of a plurality of images of the wearer obtained from a plurality of imaging devices provided in the wearable device;
    obtaining joint keypoint information corresponding to joint positions of the wearer and initial shape coefficient information associated with a shape of the wearer based on the feature map, for each of the images, wherein the joint keypoint information comprises two-dimensional (2D) pixel information and depth information;

determining a target 3D joint angle for 3D modeling of the wearer based on the joint keypoint information and the initial shape coefficient information;

determining target shape coefficient information for 3D modeling of the wearer based on the joint keypoint information and the initial shape coefficient information; and obtaining a 3D mesh of the wearer based on the target 3D joint angle and the target shape coefficient information, wherein the obtaining of the initial shape coefficient information includes obtaining the initial shape coefficient through a performed regression only on the feature map of a first frame.

2. The processor-implemented method of claim 1, wherein the feature map is generated based on at least one of a deep convolutional neural network, a deep convolutional neural network with depthwise separable convolutions, and a deep residual learning neural network.

3. The processor-implemented method of claim 1, wherein the obtaining of the joint keypoint information and the initial shape coefficient information for each of the images comprises:

obtaining the 2D pixel information inferred based on the feature map and a first convolutional neural network (CNN) model; and obtaining the depth information inferred based on the feature map and a second CNN model.

4. The processor-implemented method of claim 1, wherein the determining of the target 3D joint angle comprises:

calculating an error of the 2D pixel information;

calculating an error of the depth information;

calculating a 3D joint angle error with respect to time;

calculating a total error of a 3D joint angle based on the error of the 2D pixel information, the error of the depth information, and the 3D joint angle error with respect to time; and determining, to be the target 3D joint angle, a 3D joint angle minimizing the total error.

5. The processor-implemented method of claim 4, wherein the 3D joint angle error with respect to time is calculated based on Equation 4, $$E_{temp} = \|\theta - \theta_{t-1}\|_2^2 \qquad \text{Equation 4:}$$

wherein $E_{temp}$ denotes the 3D joint angle error with respect to time, $\theta$ denotes a 3D joint angle, $\theta_{t-1}$ denotes a 3D joint angle in an immediately previous frame, and $\|\ \|_2^2$ is a square of an L2-norm that denotes a sum of squares of respective components.

6. The processor-implemented method of claim 4, wherein the imaging devices comprise a left imaging device provided on a left side of the wearable device and a right imaging device provided on a right side of the wearable device, and the error of the 2D pixel information is calculated based on Equation 1, $$E_{2D} = \sum_i \left\| v_{li} \left( \prod_l (X_i(\theta, \beta_{t-1})) - \hat{p}_{li} \right) \right\|_2^2 + \left\| v_{ri} \left( \prod_r (X_i(\theta, \beta_{t-1})) - \hat{p}_{ri} \right) \right\|_2^2, \qquad \text{Equation 1}$$

wherein $E_{2D}$ denotes the error of the 2D pixel information, $\theta$ denotes a 3D joint angle, $\beta$ denotes shape coefficient information, $X_i$ denotes 3D position information of an ith joint in a skinned multi-person linear model (SMPL) that outputs vertices using $\theta$ and $\beta$ as an input, $\Pi_l$ denotes a function for projection to a position at which the left imaging device is provided, $\Pi_r$ denotes a function for projection to a position at which the right imaging device is provided, $\hat{p}_{li}$ denotes the 2D pixel information of the ith joint in an image obtained by the left imaging device, $\hat{p}_{ri}$ denotes the 2D pixel information of the ith joint in an image obtained by the right imaging device, $v_{li}$ denotes information as to whether the ith joint is observed in the image obtained by the left imaging device and it is 1 when the joint is observed and is 0 when the joint is not observed, $v_{ri}$ denotes information as to whether the ith joint is observed in the image obtained by the right imaging device and it is 1 when the joint is observed and is 0 when the joint is not observed, and $\|\ \|_2^2$ is a square of an L2-norm that denotes a sum of squares of respective components.

7. The processor-implemented method of claim 6, wherein initial shape coefficient information $\beta_0$ which is an initial value of the shape coefficient information $\beta$ is a mean of initial shape coefficient information $\beta_l$ obtained from the image obtained by the left imaging device and initial shape coefficient information $\beta_r$ obtained from the image obtained by the right imaging device.

8. The processor-implemented method of claim 4, wherein the imaging devices comprise a left imaging device provided on a left side of the wearable device and a right imaging device provided on a right side of the wearable device, the error of the depth information is calculated by summating an error of left depth information and an error of right depth information, wherein the error of the left depth information is calculated based on Equation 2 and the error of the right depth information is calculated based on Equation 3, $$E_{dist\_l} = \sum_i \left\| v_{li} \left( dist_l(X_i(\theta, \beta_{t-1})) - dist_l(X_0(\theta, \beta_{t-1})) - (\hat{d}_{li} - \hat{d}_{l0}) \right) \right\|_2^2, \qquad \text{Equation 2}$$

wherein $E_{dist\_l}$ denotes the error of the left depth information, $\theta$ denotes a 3D joint angle, $\beta$ denotes shape coefficient information, $X_i$ denotes 3D position information of an ith joint in an SMPL that outputs vertices using $\theta$ and $\beta$ as an input, $dist_l$ denotes joint depth information in the SMPL in an image obtained by the left imaging device, $X_0$ denotes 3D position information of a reference joint in the SMLP, $v_{li}$ denotes information as to whether the ith joint is observed in the image obtained by the left imaging device and it is 1 when the joint is observed and is 0 when the joint is not observed, $\hat{d}_{li}$ denotes depth information of the ith joint in the image obtained by the left imaging device, $\hat{d}_{l0}$ denotes an initial value of the depth information of the ith joint in the image obtained by the left imaging device, and $\|\ \|_2^2$ is a square of an L2-norm that denotes a sum of squares of respective components, and $$E_{dist\_r} = \quad \text{Equation 3}$$

$$\sum_i \left\| v_{ri}(dist_r(X_i(\theta, \beta_{t-1})) - dist_r(X_0(\theta, \beta_{t-1})) - (\hat{d}_{ri} - \hat{d}_{r0})) \right\|_2^2,$$

wherein $E_{dist\_r}$ denotes the error of the right depth information, θ denotes a 3D joint angle, β denotes shape coefficient information, $X_i$ denotes 3D position information of an ith joint in an SMPL that outputs vertices using θ and β as an input, $dist_r$ denotes joint depth information in the SMPL in an image obtained by the right imaging device, $X_0$ denotes 3D position information of a reference joint in the SMPL, $v_{ri}$ denotes information as to whether the ith joint is observed in the image obtained by the right imaging device and it is 1 when the joint is observed and is 0 when the joint is not observed, $\hat{d}_{ri}$ denotes depth information of the ith joint in the image obtained by the right imaging device, $\hat{d}_{r0}$ denotes an initial value of the depth information of the ith joint in the image obtained by the right imaging device, and $\|\ \|_2^2$ is a square of an L2-norm that denotes a sum of squares of respective components.

9. The processor-implemented method of claim 1, wherein the target shape coefficient information is calculated based on Equation 5, Equation 5:

$$\hat{\beta} = \min\left(\sum_t E_{2D}(\theta_t, \beta)\right) \quad \text{Equation 5}$$

wherein $\hat{\beta}$ denotes the target shape coefficient information, $E_{2D}$ denotes an error of the 2D pixel information, θ denotes a 3D joint angle, and β denotes shape coefficient information.

10. The processor-implemented method of claim 1, wherein each of the imaging devices comprises a fisheye lens.

11. The processor-implemented method of claim 1, wherein the wearable device is one of augmented reality (AR) glass and a head-mounted display (HMD).

12. The processor-implemented method of claim 1, wherein at least two of the imaging devices are disposed at a left end and a right end of the wearable device to each form a preset angle downward, and each of the at least two of the imaging devices has a field of view (FoV) of a preset size.

13. A non-transitory computer-readable storage medium storing instructions that, when executed by a processor, cause the processor to perform the method of claim 1.

14. The method of claim 1, wherein the generating of the feature map for each of a plurality of images includes extracting a feature map from each of a plurality of images using one or more feature extraction machine learning models respectively provided the plurality of images.

15. The method of claim 1, wherein the determining of the target 3D joint angle for 3D modeling of the wearer is based on an iterative process, which considers the joint keypoint information and the initial shape coefficient information, that results in the target 3D angle that minimizes a loss of the iterative process.

16. The method of claim 1, wherein the determining target shape coefficient information for 3D modeling of the wearer is based on an iterative process, which considers the joint keypoint information and the initial shape coefficient information, that results in the shape coefficient information that minimizes a loss of the iterative process.

17. A processor-implemented method with three-dimensional (3D) modeling of a wearer of a wearable device, comprising:
  generating a feature map for each of a plurality of images of the wearer obtained from a plurality of imaging devices provided in the wearable device;
  obtaining joint keypoint information corresponding to joint positions of the wearer and initial shape coefficient information associated with a shape of the wearer based on the feature map, for each of the images, wherein the joint keypoint information comprises two-dimensional (2D) pixel information and depth information;
  determining a target 3D joint angle for 3D modeling of the wearer based on the joint keypoint information and the initial shape coefficient information;
  determining target shape coefficient information for 3D modeling of the wearer based on the joint keypoint information and the initial shape coefficient information; and
  obtaining a 3D mesh of the wearer based on the target 3D joint angle and the target shape coefficient information,
  wherein the determining of the target 3D joint angle comprises:
  calculating an error of the 2D pixel information;
  calculating an error of the depth information;
  calculating a 3D joint angle error with respect to time;
  calculating a total error of a 3D joint angle based on the error of the 2D pixel information, the error of the depth information, and the 3D joint angle error with respect to time; and
  determining, to be the target 3D joint angle, a 3D joint angle minimizing the total error, and
  wherein the imaging devices comprise a left imaging device provided on a left side of the wearable device and a right imaging device provided on a right side of the wearable device, and the error of the 2D pixel information is calculated based on Equation 1, $$E_{2D} = \quad \text{Equation 1}$$

$$\sum_i \left\| v_{li}\left(\prod_l (X_i(\theta, \beta_{t-1})) - \hat{p}_{li}\right) \right\|_2^2 + \left\| v_{ri}\left(\prod_r (X_i(\theta, \beta_{t-1})) - \hat{p}_{ri}\right) \right\|_2^2,$$

wherein $E_{2D}$ denotes the error of the 2D pixel information, θ denotes a 3D joint angle, β denotes shape coefficient information, $X_i$ denotes 3D position information of an ith joint in a skinned multi-person linear model (SMPL) that outputs vertices using θ and β as an input, $\Pi_l$ denotes a function for projection to a position at which the left imaging device is provided, $\Pi_r$ denotes a function for projection to a position at which the right imaging device is provided, $\hat{p}_{li}$ denotes the 2D pixel information of the ith joint in an image obtained by the left imaging device, $\hat{p}_{ri}$ denotes the 2D pixel information of the ith joint in an image obtained by the right imaging device, $v_{li}$ denotes information as to whether the ith joint is observed in the image obtained by the left imaging device and it is 1 when the joint is observed and is 0 when the joint is not observed, $v_{ri}$ denotes information as to whether the ith joint is observed in the image obtained by the right imaging device and it is 1 when the joint is observed and is 0 when the joint is not observed, and $\| \|_2^2$ is a square of an L2-norm that denotes a sum of squares of respective components.

18. The processor-implemented method of claim 17, wherein initial shape coefficient information $\beta_0$ which is an initial value of the shape coefficient information $\beta$ is a mean of initial shape coefficient information $\beta_l$ obtained from the image obtained by the left imaging device and initial shape coefficient information $\beta_r$ obtained from the image obtained by the right imaging device.

19. A processor-implemented method with three-dimensional (3D) modeling of a wearer of a wearable device, comprising:
generating a feature map for each of a plurality of images of the wearer obtained from a plurality of imaging devices provided in the wearable device;
obtaining joint keypoint information corresponding to joint positions of the wearer and initial shape coefficient information associated with a shape of the wearer based on the feature map, for each of the images, wherein the joint keypoint information comprises two-dimensional (2D) pixel information and depth information;
determining a target 3D joint angle for 3D modeling of the wearer based on the joint keypoint information and the initial shape coefficient information;
determining target shape coefficient information for 3D modeling of the wearer based on the joint keypoint information and the initial shape coefficient information; and
obtaining a 3D mesh of the wearer based on the target 3D joint angle and the target shape coefficient information,
wherein the determining of the target 3D joint angle comprises:
calculating an error of the 2D pixel information;
calculating an error of the depth information;
calculating a 3D joint angle error with respect to time;
calculating a total error of a 3D joint angle based on the error of the 2D pixel information, the error of the depth information, and the 3D joint angle error with respect to time; and
determining, to be the target 3D joint angle, a 3D joint angle minimizing the total error, and
wherein the imaging devices comprise a left imaging device provided on a left side of the wearable device and a right imaging device provided on a right side of the wearable device, the error of the depth information is calculated by summating an error of left depth information and an error of right depth information, wherein the error of the left depth information is calculated based on Equation 2 and the error of the right depth information is calculated based on Equation 3, $$E_{dist\_l} = \sum_i \left\| v_{li}\left(dist_l(X_i(\theta, \beta_{t-1})) - dist_l(X_0(\theta, \beta_{t-1}))\right) - \left(\hat{d}_{li} - \hat{d}_{l0}\right) \right\|_2^2, \quad \text{Equation 2}$$

wherein $E_{dist\_l}$ denotes the error of the left depth information, $\theta$ denotes a 3D joint angle, $\beta$ denotes shape coefficient information, $X_i$ denotes 3D position information of an ith joint in an SMPL that outputs vertices using $\theta$ and $\beta$ as an input, $dist_l$ denotes joint depth information in the SMPL in an image obtained by the left imaging device, $X_0$ denotes 3D position information of a reference joint in the SMLP, $v_{li}$ denotes information as to whether the ith joint is observed in the image obtained by the left imaging device and it is 1 when the joint is observed and is 0 when the joint is not observed, $\hat{d}_{li}$ denotes depth information of the ith joint in the image obtained by the left imaging device, $\hat{d}_{l0}$ denotes an initial value of the depth information of the ith joint in the image obtained by the left imaging device, and $\| \|_2^2$ is a square of an L2-norm that denotes a sum of squares of respective components, and Equation 3:

$$E_{dist\_r} = \sum_i \left\| v_{ri}\left(dist_r(X_i(\theta, \beta_{t-1})) - dist_r(X_0(\theta, \beta_{t-1}))\right) - \left(\hat{d}_{ri} - \hat{d}_{r0}\right) \right\|_2^2, \quad \text{Equation 3}$$

wherein $E_{dist\_r}$ denotes the error of the right depth information, $\theta$ denotes a 3D joint angle, $\beta$ denotes shape coefficient information, $X_i$ denotes 3D position information of an ith joint in an SMPL that outputs vertices using $\theta$ and $\beta$ as an input, $dist_r$ denotes joint depth information in the SMPL in an image obtained by the right imaging device, $X_0$ denotes 3D position information of a reference joint in the SMPL, $v_{ri}$ denotes information as to whether the ith joint is observed in the image obtained by the right imaging device and it is 1 when the joint is observed and is 0 when the joint is not observed, $\hat{d}_{ri}$ denotes depth information of the ith joint in the image obtained by the right imaging device, $\hat{d}_{r0}$ denotes an initial value of the depth information of the ith joint in the image obtained by the right imaging device, and $\| \|_2^2$ is a square of an L2-norm that denotes a sum of squares of respective components.

20. A wearable device configured to perform a method with three-dimensional (3D) modeling of a wearer, the wearable device comprising:
a plurality of imaging devices configured to obtain a plurality of images of the wearer;
a memory configured to store therein computer-executable instructions; and
a processor configured to execute the instructions by accessing the memory,
wherein in response to the instructions being executed by the processor, the processor is configured to:
generate a feature map for each of the images;
obtain joint keypoint information corresponding to joint positions of the wearer and initial shape coefficient information associated with a shape of the wearer based on the feature map, for each of the images, wherein the joint keypoint information comprises two-dimensional (2D) pixel information and depth information;
determine a target 3D joint angle for 3D modeling of the wearer based on the joint keypoint information and the initial shape coefficient information;
determine target shape coefficient information for 3D modeling of the wearer based on the joint keypoint information and the initial shape coefficient information; and
obtain a 3D mesh of the wearer based on the target 3D joint angle and the target shape coefficient information,
wherein, for the obtaining of the initial shape coefficient information, the processor is configured to obtain the initial shape coefficient through a performed regression only on the feature map of a first frame.

21. The wearable device of claim 20, wherein the processor is configured to:
- obtain the 2D pixel information inferred based on the feature map and a first convolutional neural network (CNN) model; and
- obtain the depth information inferred based on the feature map and a second CNN model.

22. The wearable device of claim 20, wherein the processor is configured to:
- calculate an error of the 2D pixel information;
- calculate an error of the depth information;
- calculate a 3D joint angle error with respect to time;
- calculate a total error based on the error of the 2D pixel information, the error of the depth information, and the 3D joint angle error with respect to time; and
- determine, to be the target 3D joint angle, a 3D joint angle minimizing the total error.

23. The wearable device of claim 22, wherein the processor is configured to:
- determine, to be the target shape coefficient information, shape coefficient information minimizing a value obtained by summating values output by inputting the 3D joint angle error with respect to time to the error of the 2D pixel information.

24. The wearable device of claim 20, wherein each of the imaging devices comprises a fisheye lens.

25. The wearable device of claim 20, wherein the wearable device is one of augmented reality (AR) glass and a head-mounted display (HMD).

26. The wearable device of claim 20, wherein at least two of the imaging devices are provided at a left end and a right end of the wearable device to each form a preset angle downward, and each of the at least two of the imaging devices has a field of view (FoV) of a preset size.

* * * * *